(12) United States Patent
Parrinello et al.

(10) Patent No.: US 7,166,156 B2
(45) Date of Patent: *Jan. 23, 2007

(54) INK RECORDABLE SUBSTRATE COATING COMPOSITION HAVING A PH LESS THAN 7

(75) Inventors: Luciano M. Parrinello, Allison Park, PA (US); Randall D. Rogers, Apollo, PA (US); Charles T. Hill, New Brighton, PA (US); Larry E. Lipko, North Irwin, PA (US); Paul L. Benenati, Wadsworth, OH (US); Peter M. Nowakowski, Gibsonia, PA (US); Joseph P. Kovacs, The Woodlands, TX (US); Charles F. Kahle, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 96 days.

This patent is subject to a terminal disclaimer.

(21) Appl. No.: 10/654,433

(22) Filed: Sep. 3, 2003

(65) Prior Publication Data

US 2004/0091692 A1 May 13, 2004

Related U.S. Application Data

(63) Continuation-in-part of application No. 10/319,360, filed on Dec. 13, 2002, which is a continuation-in-part of application No. 10/205,033, filed on Jul. 26, 2002.

(60) Provisional application No. 60/309,348, filed on Aug. 1, 2001.

(51) Int. Cl.
 C09D 175/04 (2006.01)
 B41M 5/52 (2006.01)

(52) U.S. Cl. .................. 106/287.3; 106/287.29; 428/32.3

(58) Field of Classification Search ........... 524/507, 524/560, 558

See application file for complete search history.

(56) References Cited

U.S. PATENT DOCUMENTS

| | | | |
|---|---|---|---|
| 3,470,310 A | 9/1969 | Shashoua | 178/5.2 |
| 3,873,484 A | 3/1975 | Bluestein et al. | 260/29.2 |
| 4,861,644 A | 8/1989 | Young et al. | 428/195 |
| 4,892,779 A | 1/1990 | Leatherman et al. | 428/220 |
| 5,196,262 A | 3/1993 | Schwarz et al. | 428/315.5 |
| 5,320,897 A * | 6/1994 | Kondo et al. | 428/32.36 |
| 5,709,976 A | 1/1998 | Malhotra | 430/124 |
| 6,001,466 A * | 12/1999 | Noguchi et al. | 428/327 |
| 6,020,058 A | 2/2000 | Pekala et al. | 428/327 |
| 6,025,068 A | 2/2000 | Pekala | 428/315.5 |
| 6,140,412 A | 10/2000 | Saitoh et al. | 524/591 |
| 6,221,954 B1 | 4/2001 | Bechara et al. | 524/591 |
| 6,632,485 B1 * | 10/2003 | Tang et al. | 428/32.1 |
| 6,656,545 B1 * | 12/2003 | Schliesman et al. | 428/32.15 |
| 6,821,584 B1 * | 11/2004 | Tashiro et al. | 428/32.24 |
| 2003/0096087 A1 * | 5/2003 | Benenati et al. | 428/195 |
| 2003/0170405 A1 * | 9/2003 | Parrinello et al. | 428/32.11 |
| 2004/0002570 A1 * | 1/2004 | Parrinello et al. | 524/507 |
| 2004/0091692 A1 * | 5/2004 | Parrinello et al. | 428/315.5 |
| 2004/0105940 A1 * | 6/2004 | Parrinello et al. | 428/32.1 |
| 2004/0105971 A1 * | 6/2004 | Parrinello et al. | 428/317.9 |

FOREIGN PATENT DOCUMENTS

| | | |
|---|---|---|
| EP | 1 078 774 A2 | 2/2001 |
| JP | 2001-184881 | 7/2001 |
| WO | WO 03/011608 A1 | 2/2003 |
| WO | WO 03/020530 A1 | 3/2003 |
| WO | WO 03/089533 A1 | 10/2003 |

OTHER PUBLICATIONS

U.S. Appl. No. 60/309,348, filed Aug. 1, 2001 "Water Resistant Ink Jet Printable Sheet".
U.S. Appl. No. 60/317,113, filed Sep. 5, 2001 "Polymer Processing of a Water-Resistant Ink Jet Recording Substrate".
U.S. Appl. No. 60/373,957, filed Apr. 19, 2002 "Water Resistant Ink Jet Recordable Substrate".
International Standard ISO/IEC 7810, Identification cards-Physical characteristics, Second edition Aug. 15, 1995.

* cited by examiner

Primary Examiner—Monique R. Jackson
(74) Attorney, Agent, or Firm—Deborah M. Altman; Carol A. Marmo

(57) ABSTRACT

A water resistant coating composition for ink jet recordable substrates having a pH of less than 7, which includes:
 (a) an aqueous polyurethane dispersion; and
 (b) an aqueous solution of a nitrogen containing polymeric dye fixative compound. When applied to a suitable substrate, the coating composition allows for the recording of sharp, waterfast images. A coated ink recordable substrate is also disclosed, which includes a substrate having at least one side and at least one side of the substrate has a coating layer derived from the above described coating composition.

14 Claims, No Drawings

INK RECORDABLE SUBSTRATE COATING COMPOSITION HAVING A PH LESS THAN 7

BACKGROUND OF THE INVENTION

The present invention is directed to an ink jet recordable substrate. In particular, the present invention relates to a water-resistant, coated, ink jet recordable substrate. This application is a continuation-in-part application of U.S. patent application Ser. No. 10/319,360 filed on Dec. 13, 2002, which is a continuation-in-part application of U.S. patent application Ser. No. 10/205,033 filed on Jul. 26, 2002, which is a conversion of U.S. Provisional Patent Application Ser. No. 60/309,348 filed on Aug. 1, 2001.

It is known in the art to size paper with sizing components for the purpose of retarding or preventing penetration of liquids into the structure. "Internal sizing" consists of introducing sizing materials into the pulp during the paper making operation. The sizing materials are precipitated onto the fibers primarily for the purpose of controlling penetration of liquids into the final dry paper. "Surface sizing" involves the application of dispersions of film-forming substances such as converted starches, gums, and modified polymers, to previously formed paper. Surface sizing imparts strength to the paper.

The use of sized paper to print with an ink jet printer containing predominantly water-based inks may yield imaged papers which have a tendency to curl into tubes. The use of un-sized paper may result migration of the image through the sheet and interference with the image on the other side, if one side of the imaged sheet comes into contact with water.

Various attempts have been made in the art to overcome the forgoing problems. For example, U.S. Pat. No. 5,709,976 discloses a paper substrate coated with a hydrophobic barrier material and an image receiving layer. The hydrophobic barrier layer is coated on both sides of the paper and includes a water insoluble component and a water or alcohol soluble anti-curl agent. U.S. Pat. No. 6,140,412 teaches a process for coating paper with an aqueous cationic polyurethane resin solution. Japanese Patent (JP) 11216945 discloses a process for coating paper with a composition that includes polyvinylpyrrolidone, a polyurethane resin emulsion, polyvinyl alcohol and a cationic resin.

U.S. Pat. Nos. 4,861,644 and 5,196,262 disclose a microporous material sheet which includes a matrix of linear ultrahigh molecular weight polyolefin, a large proportion of finely divided water-insoluble siliceous filler, and interconnecting pores. U.S. Pat. No. 6,025,068 teaches a method of coating a microporous polyolefin substrate with a coating composition which includes a binder dissolved or dispersed in a volatile aqueous liquid medium. The binder includes a film-forming organic polymer of a water-soluble poly(ethylene oxide) and a water-soluble or water-dispersible crosslinkable urethane-acrylate hybrid polymer.

Another coating composition for ink jet recording materials is disclosed in Japanese Patent (JP) 2001-184881. This reference discloses a coating composition that includes a nonionic or anionic polyurethane and the reaction product of a monomeric secondary amine and epichlorohydrin. Japanese Patents (JP) 11268406 and (JP) 2000153667 disclose cationic polyurethanes that are useful in waterproofing coatings for ink jet printing substrates.

There remains a need for an ink jet recording medium that is durable, water-resistant and able to record sharp images when an ink jet printing ink is applied thereto.

SUMMARY OF THE INVENTION

The present invention is directed to a water-resistant coating composition for an ink jet recordable substrate. The coating composition has a pH of less than 7 and includes:
(a) an aqueous polyurethane dispersion; and
(b) an aqueous solution of a cationic nitrogen-containing polymeric dye fixative compound.

The present invention is also directed to a method of coating an ink jet recordable substrate in which the above-defined coating composition is applied to the substrate.

The present invention is further directed to an ink jet recordable substrate wherein at least one side of the substrate has a coating layer of the above-described coating composition.

DETAILED DESCRIPTION OF THE INVENTION

Unless otherwise indicated, all numbers or expressions referring to quantities of ingredients, reaction conditions, etc. used herein are to be understood as modified in all instances by the term "about."

Unless otherwise indicated, all references to (meth)acrylic, (meth)acrylate and (meth)acrylamide monomers is meant to include both the methacrylic and acrylic species.

Various numerical ranges are disclosed in this patent application. Because these ranges are continuous, they include every value between the minimum and maximum values. Unless expressly indicated otherwise, the various numerical ranges specified in this application are approximations.

The coating composition of the present invention includes an aqueous polyurethane dispersion and an aqueous solution of a cationic nitrogen-containing polymeric dye fixative compound.

Suitable aqueous polyurethane dispersions for use in the present invention include any known water-dispersible nonionic polyurethanes, anionic polyurethanes, cationic polyurethanes, and mixtures thereof.

The mixing of an anionic polymer and a cationic polymer typically results in a polysalt which is often insoluble in water and other solvents. In the present invention, it has been surprisingly found that the addition of an aqueous solution of a cationic nitrogen-containing polymer to an aqueous anionic polyurethane dispersion results in a stable dispersion which is useful as a coating composition for an ink jet recordable substrate. However, a reversal in the order of addition such that the anionic polyurethane dispersion is added to the aqueous solution of a cationic nitrogen-containing polymer, results in the formation and precipitation of a polysalt from the aqueous solution.

An aqueous dispersion of an anionic polyurethane resin for use in the invention comprises particles of an anionic polyurethane polymer dispersed in an aqueous medium. The polyurethane polymer has at least one pendent acid group which may be neutralized in the presence of a base to form anionic group(s), which stabilize the dispersion.

The anionic polyurethane for use in the invention may be prepared by a method known in the art. For example, the reaction of (i) a polyisocyanate, (ii) a polyol, (iii) a compound having an acid group, and optionally (iv) a chain-extending compound such as a polyamine or hydrazine, produces a suitable anionic polyurethane. As used herein and the claims, "polyisocyanate" refers to a compound having more than one isocyanate group. Examples of suitable polyisocyanates for use in the present invention include diisocyanates such as toluene diisocyanate, hexamethylene diisocyanate, isophorone diisocyanate and dicyclohexyl methane diisocyanate; three or more functional isocyanates which may be the reaction products of diisocyanates with polyols such as trimethylol propane, glycerol and pentaerythritol. Suitable polyisocyanates for use in the invention are commercially available from Bayer Corporation under the tradename Desmodur.

As used herein and the claims, "polyol" refers to a compound with more than one hydroxyl group. Examples of suitable polyols are simple polyols such as those used to prepare polyisocyanate, polyester polyols and polyether polyols.

The anionic polyurethane for use in the present invention may include an acid group such as a carboxylic acid or sulfonic acid group and two groups, which can react with either a polyisocyanate or a polyol. An example of a group, which may react with a polyol, is an isocyanate group. Examples of groups which may react with a polyisocyanate include hydroxyl groups and amine groups. An example of a compound having two hydroxyl groups and an acid group is dimethylol proprionic acid. An example of a polyamine includes ethylene diamine, isophorone diamine or diethylene triamine.

The anionic polyurethane dispersion for use in the invention is dispersed using a base which ionizes the acidic group(s) on the polymer and stabilizes the dispersion. The base may include any known inorganic base, ammonia or an amine.

The (i) polyisocyanate, (ii) the compound having an acid group, and (iii) the polyol may be reacted in the presence of an organic solvent to form an isocyante-terminated prepolymer. Suitable organic solvents include n-methyl pyrrolidone, tetrahydrofuran or a glycol ether. The isocyanate-terminated prepolymer may be dispersed in water in the presence of a base, and then chain extended by adding the polyamine. In an embodiment, the prepolymer is chain extended in an organic solvent solution and then the polyurethane polymer is dispersed in water in the presence of the base.

Suitable anionic polyurethanes for use in the present invention include anionic polyurethanes based on aromatic polyether polyurethanes, aliphatic polyether polyurethanes, aromatic polyester polyurethanes, aliphatic polyester polyurethanes, aromatic polycaprolactam polyurethanes, and/or aliphatic polycaprolactam polyurethanes. An anionic polyurethane dispersion for use in the present invention is commercially available from Crompton Corporation under the tradename WitcoBond®.

The aqueous anionic polyurethane dispersion of the coating composition contains up to 70 wt. %, or up to 65 wt. %, or up to 60 wt. %, or up to 50 wt. % of the anionic polyurethane. The aqueous anionic polyurethane dispersion includes at least 1 wt. %, or at least 5 wt. %, or at least 10 wt. %, or at least 20 wt. % of the anionic polyurethane. The amount of anionic polyurethane in the aqueous anionic polyurethane dispersion is not critical. In general, the amount should not be so high as to cause the dispersion itself or the mixture with the nitrogen-containing polymer to be unstable, or so low that the coating composition does not provide sufficient water and rub resistance or that the dispersion itself becomes unstable. The anionic polyurethane may be present in the aqueous anionic polyurethane dispersion in any range of values inclusive of those stated above.

The cationic polyurethane dispersion for use in the present invention may include a known water-dispersible cationic polyurethane. Suitable cationic polyurethanes are available commercially from Crompton Corporation under the tradename Witcobond, for example, Witcobond W-213 and W-215 formulations.

The cationic polyurethane may be prepared by a method known in the art. U.S. Pat. No. 3,470,310 discloses the preparation of a water dispersion of a polyurethane which contains salt-type groups bonded into the polyurethane. U.S. Pat. No. 3,873,484 discloses an aqueous dispersion of a polyurethane prepared from quaternized polyurethane prepolymer prepared by reacting an alkoxylated diol, an N-alkyl dialkanolamine, an organic diisocyanate and quaternizing with a dialkyl sulfate quaternizing agent. U.S. Pat. No. 6,221,954 teaches a method for making a polyurethane prepolymer in which a N-monoalkanol tertiary amine is reacted with an alkylene oxide in the presence of a strong acid to form a polyol salt, which is further reacted with an excess amount of an organic polyisocyanate and chain extended with an active hydrogen-containing compound. These references are herein incorporated by reference.

The aqueous cationic polyurethane dispersion for use in the present invention contains up to 70 wt. %, or up to 65 wt. %, or up to 60 wt. %, or up to 50 wt. % of the cationic polyurethane. The aqueous cationic polyurethane dispersion includes at least 1 wt. %, or at least 5 wt. %, or at least 10 wt. %, or at least 20 wt. % of the cationic polyurethane. The amount of cationic polyurethane in the aqueous cationic polyurethane dispersion is not critical. In general, the amount should not be so high as to cause the dispersion itself or the mixture with the nitrogen-containing polymer to be unstable, or so low that the coating composition does not provide sufficient water and rub resistance or that the dispersion itself becomes unstable. The cationic polyurethane may be present in the aqueous cationic polyurethane dispersion in any range of values inclusive of those stated above.

The nonionic polyurethane dispersion for use in the present invention may include a known water-dispersible nonionic polyurethane. Suitable cationic polyurethanes are available commercially from Crompton Corporation under the tradename Witcobond, for example, Witcobond W-230 formulation.

The nonionic polyurethane may be prepared by a method known in the art. For example, Szycher (i.e., "Szycher's Book of Polyurethanes" by Michael Szycher, CRC Press, New York, N.Y., 1999, pages 14–10 through 14–15) describes the preparation of water dispersions of polyurethanes, which contain hydrophilic polyether-type groups either branching off or terminating on the main polyurethane chains. Polyethylene oxide units (having a molecular weight (MW) of from 200 to 4,000) are typically used as dispersing sites. Nonionic polyurethanes may be prepared by the use of diols or diisocyanate comonomers bearing pendant polyethylene oxide chains.

The aqueous nonionic polyurethane dispersion for use in the present invention contains up to 70 wt. %, or up to 65 wt. %, or up to 60 wt. %, or up to 50 wt. % of the nonionic polyurethane. The aqueous nonionic polyurethane dispersion includes at least 1 wt. %, or at least 5 wt. %, or at least 10 wt. %, or at least 20 wt. % of the nonionic polyurethane. The amount of nonionic polyurethane in the aqueous nonionic polyurethane dispersion is not critical. In general, the amount should not be so high as to cause the dispersion itself or the mixture with the nitrogen-containing polymer to be unstable, or so low that the coating composition does not provide sufficient water and rub resistance or that the dispersion itself becomes unstable. The nonionic polyurethane may be present in the aqueous nonionic polyurethane dispersion in any range of values inclusive of those stated above.

The aqueous solution of a cationic nitrogen-containing polymer for use as a dye fixative in the coating composition of the present invention, has a pH of less than 7, or less than 6, or less than 5. A pH value within this range allows for at least a portion of the nitrogen atoms to carry at least a portion of a cationic charge. The resulting coating composition will have a pH of less than 7, or less than 6, or less than 5.

As used herein and in the claims, "aqueous solution" means that the cationic nitrogen-containing polymer is soluble in a liquid medium such as water.

A dye fixative is generally used to fix dyes to a substrate to preclude the dyes from bleeding or migrating out of the substrate when the substrate is contacted with water.

A known cationic nitrogen-containing polymer in which at least a portion of the nitrogen atoms carry at least a portion of a cationic charge within the above-mentioned pH range of the coating composition, may be used in the present coating composition as a dye fixative. Suitable cationic nitrogen-containing polymers include cationic polymers having one or more monomer residues derived from one or more of the following nitrogen-containing monomers:

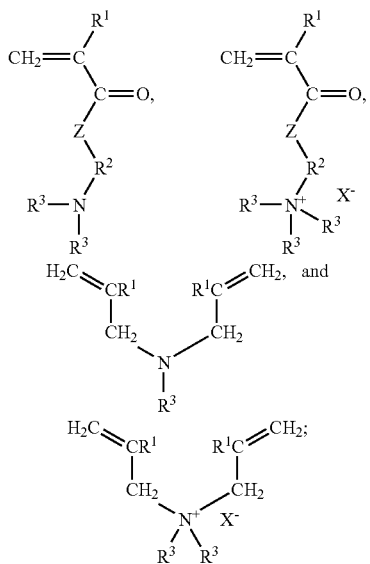

where $R^1$ represents independently for each occurrence in each structure, H or $C_1$ to $C_3$ aliphatic; $R^2$ represents independently for each structure a divalent linking group selected from $C_2$ to $C_{20}$ aliphatic hydrocarbon, polyethylene glycol and polypropylene glycol; $R^3$ represents independently for each occurrence in each structure H, $C_1$ to $C_{22}$ aliphatic hydrocarbon or a residue from the reaction of the nitrogen with epichlorohydrin; Z is selected from —O— or —$NR^4$—, where $R^4$ is H or $CH_3$; and X is a halide or methylsulfate.

Examples of nitrogen-containing monomers or resulting monomer residues for use in the present invention include dimethyl aminoethyl (meth)acrylate, (meth)acryloyloxyethyl trimethyl ammonium halides, (meth)acryloyloxyethyl trimethyl ammonium methylsulfate, dimethyl aminopropyl (meth)acrylamide, (meth)acrylamidopropyl trimethyl ammonium halides, aminoalkyl (meth)acrylamides where the amine is reacted with epichlorohydrin, (meth)acrylamidopropyl trimethyl ammonium methylsulfate, diallyl amine, methyl diallyl amine, and diallyl dimethyl ammonium halides.

The cationic nitrogen-containing polymers may contain additional monomer residues. The additional monomer residues may be obtained from any polymerizable ethylenically unsaturated monomer that, when copolymerized with the nitrogen-containing monomers allows the resulting polymer to be at least partially soluble in water. As used herein and the claims, "partially soluble" refers to at least 0.1 gram of the polymer dissolving in water when ten (10) grams of the polymer is added to one (1) liter of water and mixed for 24 hours.

Examples of monomers that may be copolymerized with the nitrogen-containing monomers include (meth)acrylamide, n-alkyl (meth)acrylamides, (meth)acrylic acid, alkyl esters of (meth)acrylate, glycol esters of (meth)acrylic acid, polyethylene glycol esters of (meth)acrylic acid, hdroxyalkyl (meth)acrylates, itaconic acid, alkyl ethers of itaconic acid, maleic acid, mono- and di-alkyl esters of maleic acid, maleic anhydride, maleimide, aconitic acid, alkyl esters of aconitic acid, allyl alcohol and alkyl ethers of allyl alcohol.

In an embodiment, the cationic nitrogen-containing polymer is a homopolymer of a nitrogen-containing monomer, or a copolymer of one or more nitrogen-containing monomers. In another embodiment, the nitrogen-containing polymer is a copolymer of one or more polymerizable ethylenically unsaturated monomers and one or more nitrogen containing monomers. When the nitrogen-containing polymer includes any of the aforementioned additional polymerizable ethylenically unsaturated comonomers, the nitrogen-containing polymer includes not more than 70 mol %, or not more than 50 mol %, or not more than 25 mol %, or not more than 10 mol % of the nitrogen-containing monomer. The amount of nitrogen-containing monomer may be dependent upon the specific polyurethane used in the present coating composition. When the amount of the nitrogen-containing monomer used in the nitrogen-containing polymer is too high, an unstable mixture of the nitrogen-containing polymer and polyurethane dispersion may result. It is typically difficult to properly apply an unstable mixture to an ink recordable substrate.

When the nitrogen-containing polymer includes any of the aforementioned additional polymerizable ethylenically unsaturated comonomers, the nitrogen-containing polymer includes at least 0.1 mol %, or at least 1.0 mol %, or at least 2.5 mol %, or at least 5.0 mol % of the nitrogen-containing monomer. When the amount of nitrogen-containing monomer in the nitrogen-containing polymer is too low, the nitrogen-containing polymer may not provide adequate dye fixative properties and a recorded ink image on the coated substrate may lack water and rub fastness properties.

The nitrogen-containing monomers may be present in the nitrogen-containing polymer in any range of values inclusive of those stated above. The additional polymerizable ethylenically unsaturated monomers will be present in an amount such that the total percentage is 100 mol %.

In the present invention, the aqueous solution of the cationic nitrogen-containing polymeric dye fixative includes at least 5 wt. %, or at least 10 wt. %, or at least 15 wt. % of the nitrogen-containing polymer; and not more than 50 wt. %, or not more than 45 wt. %, or not more than 40 wt. % of the nitrogen-containing polymer. When the concentration of the nitrogen-containing polymer is too low, it is not economical for commercial applications and may be too dilute to provide optimum ratios with the polyurethane. When the concentration is too high, the solution may be too viscous to easily handle in a commercial environment. Examples of cationic nitrogen-containing polymers useful in the present invention are solutions of polyamide amines reacted with epichlorohydrin, available under the trade name CinFix from Stockhausen GmbH & Co. KG, Krefeld, Germany.

The ink jet recordable substrate coating composition of the present invention includes a mixture of an aqueous solution of a cationic nitrogen-containing polymer and an aqueous polyurethane dispersion. The mixture includes from 10 wt. % to 70 wt. %, or from 20 wt. % to 60 wt. %, or from 30 wt. % to 50 wt. % of an aqueous polyurethane dispersion. The mixture will also include from 30 wt. % to 90 wt. %, or from 40 wt. % to 80 wt. %, or from 50 wt. % to 70 wt. % of an aqueous solution of the cationic nitrogen-containing polymer. The weight percentages are based on the total weight of the ink jet recordable substrate coating composition.

In an embodiment of the present invention, water is added to the mixture of the cationic nitrogen-containing polymer and the polyurethane. When water is added to the mixture, the resulting ink jet recordable substrate coating composition has a total resin solids of from 1 wt. % to 35 wt. %, or from 1 wt. % to 20 wt. %, or from 1 wt. % to 10 wt. % based on the total weight of the ink jet recordable substrate coating composition. When the total resin solids is too high, the viscosity of the coating composition may be such that poor penetration of the coating composition results. When the total resin solids is too low, the viscosity of the coating composition may be such that poor coating to the substrate results. In an embodiment, the viscosity of the coating composition of the present invention is less than 500 cps, or less than 400 cps; and at least 10 cps, or at least 25 cps when measured using a Brookfield viscometer (RVT, spindle no. 1, 50 rpm at 25° C.). A viscosity within the aforementioned ranges provides for the coating composition to wet the substrate while maintaining a degree of porosity in the final coated substrate.

In an embodiment, the coating composition of the present invention includes a co-solvent. A co-solvent known in the art may be used. Suitable co-solvents include lower alkyl alcohols, n-methylpyrrolidone, Dowanol PM, toluene, and glycol ethers.

The coating composition of the present invention may also include other additives typically known in the art. Such additives include surfactants, such as nonionic, cationic, anionic, amphoteric and zwiterionic surfactants; rheology modifiers, such as polyvinyl alcohols, polyvinyl pyrrolidones, polyethylene oxides, polyacrylamides, natural and synthetic gums; biocides, such as a blend of 5-chloro-2-methyl-4-isothiazoline-3-one and 2-methyl-4-isothiazolin-3-one available commercially by the trade name Kathon, from Rohm and Haas Co., 2-hydroxypropylmethane thiosulfonate, and dithiocarbamates; and coupling agents, such as titanium, silane-type, trisodium pyrophosphate.

The pH of the coating composition of the present invention is less than 7, or less than 6, or less than 5. When the pH is outside of these ranges, the cationic polymeric dye fixative compound may not carry a sufficient cationic charge to perform its intended function. Further, on certain substrates the wetting action of the coating composition may be improved when the pH is within the aforementioned ranges. In an embodiment, for commercial applications, the coating composition has pH greater than 2.

The present invention is also directed to a method of preparing the ink jet recordable substrate coating composition. The present method includes the step of adding the aqueous solution of a cationic nitrogen-containing polymer into an aqueous polyurethane dispersion. Sufficient mixing is maintained during the addition to ensure that a homogeneous mixture results. It has been observed that when the aqueous anionic polyurethane dispersion is added to the aqueous solution of a cationic nitrogen-containing polymer, coagulation occurs and a homogeneous mixture is not obtained.

The present invention is further directed to a method of coating an ink jet recordable substrate. The method includes the steps of:
  (a) providing an ink jet recordable substrate having a top surface and a bottom surface;
  (b) providing the coating composition described above; and
  (c) applying the coating composition to at least one surface of the ink jet recordable substrate.

Any ink jet recordable substrate may be used in the present invention. The ink jet recordable substrate has a porosity of at least 35%, or from 35% to 80%, by volume of the substrate. The ink jet recordable substrate for use in the present invention may be any cellulosic-based paper. U.S. Pat. Nos. 4,861,644 and 5,196,262, both of which are herein incorporated by reference, describe suitable microporous substrates for use in the present invention.

In an embodiment, the ink jet recordable substrate is a microporous substrate. An example of a suitable microporous substrate includes an ink jet recordable substrate having a top surface and a bottom and which includes:
  (a) a matrix comprising a polyolefin;
  (b) a particulate siliceous filler distributed throughout the matrix; and
  (c) a network of interconnecting pores communicating throughout the microporous substrate, wherein the pores constitute at least 35 percent by volume of the microporous substrate.

Any polyolefin known in the art such as polyethylene or polypropylene may be used in the microporous substrate. In an embodiment, the polyethylene is a linear high molecular weight polyethylene having an intrinsic viscosity of at least 10 deciliters/gram and the polypropylene is a linear high molecular weight polypropylene having an intrinsic viscosity of at least 5 deciliters/gram.

As recorded herein and in the claims, intrinsic viscosity is determined by extrapolating to zero concentration the reduced viscosities or the inherent viscosities of several dilute solutions of the polyolefin wherein the solvent is distilled decahydronaphthalene to which 0.2 percent by weight, 3,5-di-tert-butyl-4-hydroxyhydrocinnamic acid, neopentanetetrayl ester [CAS Registry No. 6683-19-8] has been added. The reduced viscosities or the inherent viscosities of the polyolefin are ascertained from relative viscosities obtained at 135° C. using an Ubbelohde No. 1 viscometer.

On a coating-free, printing ink free, impregnant-free, and pre-bonding basis, pores constitute at least 35 percent by volume of the microporous substrate. In some instances, the pores constitute at least about 60 percent by volume of the microporous substrate, or from 35 percent to about 80 percent, or from 60 percent to 75 percent by volume of the microporous substrate.

The siliceous particles may be in the form of ultimate particles, aggregates of ultimate particles, or a combination of both. As used herein and in the claims, the term "ultimate particles" refers to small discrete particles of colloidal polymerized silicic acid units which make up amorphous silica. The term "aggregate" as used herein and in the claims, refers to a structure wherein ultimate particles are condensed to produce an open but continuous structure of chains or a solid structure of interconnecting pores.

In an embodiment, the siliceous particles are finely-divided. As used herein and in the claims, "finely-divided" refers to a maximum retention of 0.01% by weight on a 40 mesh sieve screen.

In a further embodiment, the siliceous particles are substantially insoluble. As used herein and in the claims, the term "substantially insoluble" refers to amorphous silica exhibiting a reproducible equilibrium solubility in water which may range from 70 ppm to greater than 150 ppm in water at a temperature of 25° C. It is believed that variations in solubility are due to differences in particle size, state of internal hydration and the presence of trace impurities in the silica or absorbed on its surface. The solubility of the silica may also be dependent on the pH of the water. As pH increases from neutrality (i.e., pH of 7) to alkalinity (i.e., pH greater than 9), the solubility of silica may increase. (See "The Chemistry of Silica", R. K. Iler, Wiley-Interscience, NY (1979), pp. 40–58.).

In the present invention, at least 90 percent by weight of the siliceous particles used in preparing the microporous substrate have particle sizes in the range of from 5 to 40 micrometers. The particle size is determined by use of a Model TaII Coulter Multisizer Particle Size Analyzer (Coulter Electronics, Inc.) wherein, prior to analysis by the Coulter Analyzer, the filler is stirred for 10 minutes in Isoton II electrolyte solution (Curtin Matheson Scientific, Inc.) using a four-blade, 4.445 centimeter diameter propeller stirrer. In an embodiment, at least 90 percent by weight of the siliceous particles have particle sizes in the range of from 10 to 30 micrometers. It is expected that the sizes of filler agglomerates may be reduced during processing of the ingredients to prepare the microporous substrate.

Suitable siliceous particles include, but are not limited to particles of silica, mica, montmorillonite, kaolinite, asbestos, talc, diatomaceous earth, vermiculite, natural and synthetic zeolites, cement, calcium silicate, aluminum silicate, sodium aluminum silicate, aluminum polysilicate, alumina silica gels, and glass particles. Silica and the clays are commonly used siliceous particles. In an embodiment, precipitated silica, silica gel, or fumed silica is used.

In an embodiment, the siliceous particles are coated prior to incorporation in the microporous substrate. A method known in the art may be used to coat the particles. The selection of the method of coating the siliceous particles is not critical. For example, the coating ingredients may be added to an aqueous slurry of pre-washed silica filter cake under sufficient stirring to allow for complete mixing of the ingredients, followed by drying, using conventional techniques known in the art.

The coating may include the aforementioned aqueous polyurethane dispersions, and/or the aforementioned cationic nitrogen-containing polymeric compounds.

U.S. patent applications having Ser. No. 09/636,711, now U.S. Pat. No. 6,342,560; Ser. Nos. 09/636,312; 09/636,310, now U.S. Pat. No. 6,649,684; Ser. Nos. 09/636,308; 09/636,311, now U.S. Pat. No.6,649,684 and Ser. No. 10/041,114 which published as U.S. Published Application No. US 2002-0107316 A1; disclose suitable coating compositions and methods of coating silica particles which may be used in the present invention, and the associated patents and patent publications of which by reference are incorporated herein.

The particulate siliceous filler constitutes from 50 to 90 percent by weight of the microporous substrate. In an embodiment, the filler constitutes from 50 to 85 percent, or from 60 to 80 percent by weight of the microporous substrate.

In addition to the siliceous particles, substantially water-insoluble non-siliceous filler particles may also be used in the microporous substrate. Examples of such optional non-siliceous filler particles include particles of titanium oxide, iron oxide, copper oxide, zinc oxide, antimony oxide, zirconia, magnesia, alumina, molybdenum disulfide, zinc sulfide, barium sulfate, strontium sulfate, calcium carbonate, magnesium carbonate, magnesium hydroxide, and finely divided substantially water-insoluble flame retardant filler particles such as particles of ethylenebis(tetra-bromophthalimide), octabromodiphenyl oxide, decabromodiphenyl oxide, and ethylenebisdibromonorbornane dicarboximide.

In an embodiment of the invention, the substrate is highly porous. The term "highly porous" refers to a substrate having a porosity of not more than 20,000, or not more than 10,000 and in many cases not more than 7,500 seconds/100 cc air. The porosity is typically at least 50 seconds/100 cc air. These porosity values are determined in accordance with the method described in ASTM D726, with the following exceptions relative to Section 8 of the ASTM. In the present invention, the sheet samples are tested without conditioning in accordance with ASTM D685, and only three (3) specimens for a given sample type are tested for a total of six (6) measurements (three measurements per two surfaces) for a given specimen type rather than a minimum of ten specimens for a given samples as stated in ASTM D726. The lower the value in seconds/cc air, the more porous is the substrate. Highly porous substrates may be produced by various methods known in the art, such as thermally treating a substrate, orienting, compositionally by increasing the filler content, microvoiding films, or etching. Examples of highly porous substrates include thermally treated microporous substrates such as Teslin® TS-1000 which is commercially available from PPG Industries, Inc., Pittsburgh, Pa.

The coated microporous substrate has a thickness of at least 0.1 mils, or from 0.5 to 100 mils, or from 1 to 50 mils, and in some cases from 4 to 14 mils. When the coated microporous substrate has a thickness which exceeds the aforementioned ranges, it may not feed properly through an ink jet printer. When the coated microporous substrate is below the stated ranges, it may not have sufficient strength for its intended use.

Any method known in the art may be used to apply the coating composition of the present invention to the ink jet recordable substrate such as flexography, spraying, air knife coating, curtain coating, dipping, rod coating, blade coating, gravure, reverse roll, roller application, imbibing, size press, printing, brushing, drawing, slot-die coating, and extrusion.

Following application of the coating composition to said substrate, the solvent is removed from the applied coating by any conventional drying technique. In an embodiment, the coating is dried by exposing the coated substrate to a temperature ranging from ambient to 350° F.

The coating composition is applied at least one time to at least one surface of the substrate. When the coating composition is applied more than one time, the applied coating is usually but not necessarily dried, either partially or totally, between coating applications.

When the coating composition is applied to a microporous substrate, the coating composition will often penetrate into the substrate. Penetration of the coating layer into the microporous substrate improves the ink jet print quality on the coated substrate. Typically, the coating layer penetrates into at least the first one (1) micron of the surface of the microporous substrate. In some instances, the coating layer penetrates into at least the first ten (10) microns, or at least the first twenty (20) microns or at least the first thirty (30) microns of the microporous substrate.

In an embodiment of the present invention, the coating composition is applied to the substrate using an air knife coating technique where the excess coating is 'blown off' by a powerful jet from the air knife. In another embodiment, a reverse roll coating method is used. In this procedure, the coating composition is measured onto an applicator roller by precision setting of the gap between an upper metering roller and the application roller below it. The coating is wiped-off the application roller by the substrate as it passes around the support roller at the bottom.

In another embodiment of the present invention, gravure coating is used to apply the coating composition. In the gravure coating method, an engraved roller runs in a coating bath, which fills the engraved dots or lines of the roller with the coating composition. Any excess coating on the roller is wiped off by a doctor blade and the coating is deposited onto the substrate as it passes between the engraved roller and a pressure roller. Reverse gravure coating methods may be used. In this method, the coating composition is metered by the engraving on a roller before being wiped off as in a conventional reverse roll coating process.

In a further embodiment a metering rod may be used to apply the coating composition. When a metering rod is used, an excess of the coating is deposited onto the substrate as it passes over a bath roller. The wire-wound metering rod, sometimes known as a Meyer Bar, allows the desired quantity of the coating to remain on the substrate. The quantity is determined by the diameter of the wire used on the rod.

The amount of the substantially dry coating applied to the substrate, or "coat weight", is measured as coating weight per coated area. The coat weight may vary widely, but in most instances will be at least 0.001 $g/m^2$, or at least 0.01 $g/m^2$, and in some cases at least 0.1 $g/m^2$. The coat weight is not more than 50 $g/m^2$, or not more than 40 $g/m^2$, and in some cases not more than 35 $g/m^2$. The coat weight may vary between any of the stated amounts.

The present invention is also directed to a coated microporous substrate. The coated microporous substrate includes the microporous substrate having at least one coated surface as described above. The surface is coated with the aforementioned coating composition which includes a cationic polymeric nitrogen containing dye fixative compound and one or more polyurethanes as described above. The substantially dried coating layer includes the polyurethane at from 10 to 70 percent, or from 20 to 60 percent, and in some cases from 30 to 55 percent by weight of the coating layer and the nitrogen-containing polymer at from 30 to 90 percent, or from 40 to 80 percent, and in some cases from 45 to 70 percent by weight of the coating layer. The amount of each component in the substantially dried coating layer is determined by the amount of each used to prepare the coating composition.

As used herein and in the claims, "substantially dry" is used to refer to the coating layer that feels dry to touch.

The ink jet recordable substrate can be printed with a wide variety of printing inks using a wide variety of printing processes. Both the printing inks and the printing processes are themselves conventional and known in the art. In a non-limiting embodiment, the substrate of the present invention can be used as an ink jet recordable substrate for ink jet printing. Printing can be accomplished prior to assembly of the ink jet recordable substrate into multilayer articles of the present invention or following the assembly of such multilayer articles.

In the present invention, the substantially water-resistant, at least partially coated, ink jet recordable substrate can be connected to at least one substantially nonporous material. As used herein and the claims, the term "connected to" means to link together or place in relationship either directly, or indirectly by one or more intervening materials. As used herein and the claims, the term "substantially nonporous material" refers to a material which is generally impervious to the passage of liquid, gas, and bacteria. On a macroscopic scale, a substantially nonporous material exhibits few if any pores. As previously mentioned, used herein and the claims, the term "pore(s)" refers to a minute opening(s) through which matter passes. Substantially nonporous materials for use in the present invention may vary widely and can comprise those materials customarily recognized and employed for their known barrier properties. Non-limiting examples of such materials include substantially nonporous thermoplastic polymers, substantially nonporous metalized thermoplastic polymers, substantially nonporous thermoset polymers, substantially nonporous elastomerics, and substantially nonporous metals. The substantially nonporous material can be in the form of a sheet, film, or foil, or other shapes can be used when desired, such as for example, plates, bars, rods, tubes, and forms of more complex shape. In one non-limiting embodiment, the substantially nonporous material for use in the present invention can be in the form or a sheet, film or foil.

As used herein and the claims, the term "thermoplastic polymer" refers to a polymer that can be softened by heat and then regain its original properties upon cooling. The term "thermoset polymer" as used herein and the claims refers to a polymer that solidifies or sets on heating and cannot be remelted.

Non-limiting examples of thermoplastic polymeric materials which are suitable for use include polyethylene, high density polyethylene, low density polyethylene, polypropylene, poly(vinyl chloride), saran, polystyrene, high impact polystyrene, nylons, polyesters such as poly(ethylene terephthalate), copolymers of ethylene and acrylic acid, copolymers of ethylene and methacrylic acid, and mixtures thereof. If desired, all or a portion of the carboxyl groups of carboxyl-containing copolymers can be neutralized with sodium, zinc, or the like. A non-limiting example of a metalized thermoplastic polymeric material is aluminized poly(ethylene terephthalate).

Non-limiting examples of thermoset polymeric materials include thermoset phenol-formaldehyde resin, thermoset melamine-formaldehyde resin, and mixtures thereof.

Non-limiting examples of elastomeric materials include natural rubber, neoprene, styrene-butadiene rubber, acrylonitrile-butadiene-styrene rubber, elastomeric polyurethanes, and elastomeric copolymers of ethylene and propylene.

Non-limiting examples of metals include iron, steel, copper, brass, bronze, chromium, zinc, die metal, aluminum, and cadmium. Most often the metals employed are alloys and thermoset polymers that can be used in the present invention include a wide variety of polymers known in the art.

The multilayer article of the present invention can be constructed using a wide variety of known methods for connecting at least one layer of an ink jet recordable substrate with at least one layer of a substantially nonporous material. In one non-limiting embodiment, at least one layer of a substantially water-resistant, at least partially coated ink jet recordable substrate can be fusion bonded to at least one layer of a substantially nonporous material. The ink jet recordable substrate generally comprises opposed major surfaces which are characteristic of sheets, films, foils, and plates. The resulting multilayer article can comprise one layer or more than one layer of the ink jet recordable substrate and one layer or more than one layer of the substantially nonporous material. In one non-limiting embodiment, at least one exterior layer is the ink jet recordable substrate. In an alternate non-limiting embodiment, the ink jet recordable substrate can be a microporous substrate.

In one non-limiting embodiment, the multilayer article of the present invention can be produced by fusion bonding in the absence of an adhesive. Fusion bonding can be accomplished using conventional techniques such as sealing through use of heated rollers, heated bars, heated plates, heated bands, heated wires, flame bonding, radio frequency (RF) sealing, and ultrasonic sealing. Solvent bonding can be used where the substantially nonporous material is at least partially soluble in the applied solvent to the extent that the surface becomes tacky. The ink jet recordable substrate can be contacted with the tacky surface, and the solvent is then removed to form the fusion bond. In a non-limiting embodiment, foamable compositions can be foamed in contact with the ink jet recordable substrate to form a fusion bond between the foam and the substrate. Films or sheets of nonporous substrate can be extruded and while still hot and tacky, contacted with the ink jet recordable substrate to form a fusion bond. The fusion bond can be permanent or peelable, depending upon the known bonding technique and/or the nature of the substantially nonporous material employed.

In one non-limiting embodiment, heat sealing is used to fusion bond the ink jet recordable substrate to the substantially nonporous material. In general, heat sealing includes inserting the ink jet recordable substrate into standard heat sealing equipment which is known in the art. In one non-limiting embodiment, the ink jet recordable substrate is inserted in conjunction with the substantially nonporous material which can be a thermoplastic and/or thermoset polymer. Heat and/or pressure can be applied to the substrate/polymer construction for a period of time. The amount of heat and/or pressure and length of time can vary widely. In general, the temperature, pressure and time are selected such that the substrate and polymer are at least partially connected together to form a multilayer article. A typical temperature can be within the range of from 100° F. to 400° F. A typical pressure can be within the range of from 5 psi to 250 psi, and a typical period of time can be in the range of from one (1) second to thirty (30) minutes. The multilayer article can then be cooled while under pressure for a typical period of time, such as thirty (30) minutes. Although the strength of the bond formed between the substrate and polymer can vary, the strength can be such that it generally exceeds the tensile properties of the substrate alone.

In one non-limiting embodiment, the substantially nonporous material can be polyvinyl chloride.

In one non-limiting embodiment, the ink jet recordable substrate employed in the present invention can be at least partially connected to a nonporous substrate such as polyethylene and polypropylene by heat sealing in the absence of an extrinsic adhesive. The resultant fusion bond is ordinarily sufficiently strong which is surprising inasmuch as the lamination of materials to polyolefins is usually difficult unless special adhesives are used.

In one non-limiting embodiment, the ink jet recordable substrate can be substantially continuously at least partially connected to the substantially nonporous material, or it can be discontinuously at least partially connected to the substantially nonporous material. Non-limiting examples of discontinuous bonds include bonding areas in the form of one or more spots, patches, strips, stripes, chevrons, undulating stripes, zigzag stripes, open-curved stripes, closed-curved stripes, irregular areas, and the like. In an alternate non-limiting embodiment, when patterns of bonds are involved, they can be random, repetitive, or a combination of both.

In another one non-limiting embodiment, an ink jet recordable substrate can be connected to a substantially nonporous material in the presence of an adhesive. The adhesive for use in the present invention can be selected from a wide variety of adhesives known in the art. Non-limiting examples of suitable adhesives include those having a sufficient molecular weight and viscosity such that the adhesive will not substantially migrate into or substantially penetrate the ink jet recordable substrate. Migration or penetration of the adhesive into the substrate can reduce the tack and bond strength of the adhesive. Non-limiting examples of suitable adhesives for use in the present invention include but are not limited to polyvinyl acetate, starches, gums, polyvinyl alcohol, animal glues, acrylics, epoxies, polyethylene-containing adhesives, and rubber-containing adhesives. The adhesive can be applied to the substrate, or to the substantially nonporous material, or to both the substrate and the substantially nonporous material. Further, the adhesive can be introduced via the use of a tie carrier coating.

The process of bonding the substrate and substantially nonporous material in the presence of an adhesive generally includes inserting the substrate/adhesive/material construction into standard processing equipment which is known in the art. Heat and/or pressure can be applied to the substrate/adhesive/material construction for a period of time. The amount of heat and/or pressure and length of time can vary widely. In general, the temperature, pressure and time are selected such that the substrate and substantially nonporous material are at least partially connected together to form a multi-layer article. A typical temperature can be within the range of from 100° F. to 400° F. A typical pressure can be within the range of from 5 psi to 250 psi, and a typical period of time can be in the range of from one (1) second to thirty (30) minutes. The multilayer article may then be cooled under pressure for a typical time period, such as thirty (30) minutes. Although the strength of the bond formed between the ink jet recordable substrate and the substantially nonporous material can vary, the bond is generally such that it typically exceeds the tensile properties of the substrate alone.

In one non-limiting embodiment of the present invention, an ink jet recordable substrate can be molded using conventional molding techniques known in the art. The substrate can be molded in the presence or the absence of a substantially nonporous material, such as a thermoplastic and/or thermoset polymer. In general, the ink jet recordable substrate is inserted into standard molding equipment which is known in the art. In one non-limiting embodiment, a thermoplastic and/or thermoset polymer is introduced onto the substrate and then the substrate/polymer construction is inserted into the mold cavity. In another one non-limiting embodiment, the substrate is placed into the mold cavity and then the thermoplastic and/or thermoset polymer is introduced onto the substrate. Heat and/or pressure can be applied to the substrate/polymer construction for a period of time. The amount of heat and/or pressure and length of time can vary widely. In general, the temperature, pressure and time are selected such that the substrate and polymer are at least partially connected together to form a multi-layer article. A typical temperature can be within the range of from 100° F. to 400° F. In a non-limiting embodiment, wherein the polymer comprises a thermoplastic polymer, the substrate/polymer construction can be heated to a temperature that equals or exceeds the melt temperature of the thermoplastic polymer. In one non-limiting embodiment, where the thermoplastic polymer can be amorphous, the substrate polymer construction can be heated to a temperature that equals or exceeds the Vicat temperature. In an alternative non-limiting embodiment, wherein the polymer comprises a thermoset polymer, the temperature can be below the curing or crosslinking temperature of the polymer. A typical pressure can be within the range of from 5 psi to 250 psi, and a typical period of time can be in the range of from one (1) second to fifteen (15) minutes. The result of a typical molding process is a re-shaping of the original article. The re-shaping is generally defined by the design of the mold cavity. Thus, in a standard molding process, a two-dimensional flat sheet can be re-shaped into a three-dimensional article.

In one non-limiting embodiment of the present invention, the ink jet recordable substrate comprises Teslin® which is available from PPG Industries, Incorporated in Pittsburgh, Pa. The thickness of the ink jet recordable substrate of the present invention varies widely depending on the application for use. In one non-limiting embodiment, the ink jet recordable substrate can be from 5 to 20 mils thick.

In general, the multilayer article of the present invention can be produced employing a variety of molding and laminating procedures known in the art, which include but are not limited to compression molding, rotational molding, injection molding, calendering, roll/nip laminating, thermoforming, vacuum forming, extrusion coating, continuous belt laminating, and extrusion laminating.

In one non-limiting embodiment, other tie coatings known in the art can be used in conjunction with the substrate and the substantially nonporous material.

In a non-limiting embodiment, a friction-reducing coating composition can be at least partially applied to at least one of the ink jet recordable substrate and the substantially nonporous material. In a further non-limiting embodiment, the friction-reducing coating composition can comprise at least one lubricant and at least one resin. There are a wide variety of lubricants and resins known to the skilled artisan that could be useful herein. Non-limiting examples of such suitable lubricants can include natural and synthetic waxes, natural and synthetic oils, polypropylene waxes, polyethylene waxes, silicone oils and waxes, polyesters, polysiloxanes, hydrocarbon waxes, carnauba waxes, microcrystalline waxes and fatty acids, and mixtures thereof. In a non-limiting embodiment, the lubricant for use in the present invention can include polysiloxanes, such as but not limited to silicone.

Non-limiting examples of suitable resins can include polyurethanes, polyesters, polyvinyl acetates, polyvinyl alcohols, epoxies, polyamides, polyamines, polyalkylenes, polypropylenes, polyethylenes, polyacrylics, polyacrylates, polyalkylene oxides, polyvinyl pyrrolidones, polyethers, polyketones, and co-polymers and mixtures thereof. In a non-limiting embodiment, the resin for use in the present invention can include styrene acrylic polymers such as but not limited to styrene acrylic-comprising polyurethanes, polyepoxies, polyvinyl alcohols, polyesters, polyethers, and co-polymers and mixtures thereof.

In a further non-limiting embodiment, the friction-reducing coating composition for use in the present invention can include Wikoff SCW 4890 and 2295 which are commercially available from Wikoff Industries, Incorporated, as poly board aqua coat products.

Not intending to be bound by any particular theory, it is believed that the molecules of the resin component of the friction-reducing coating can be at least partially interconnected or interlinked with the ink jet recordable substrate and/or the substantially nonporous material, such that the silicone can be essentially fixed to the surface of said substrate and/or said material. In a non-limiting embodiment, the molecules of a thermoplastic resin component can be interconnected by fusion to the ink jet recordable substrate and/or the substantially nonporous material. In another non-limiting embodiment, the molecules of a thermoset resin component can be interlinked by crosslinking to the ink jet recordable substrate and/or the substantially nonporous material.

In a further non-limiting embodiment, the friction-reducing coating composition can comprise water and/or an organic solvent. A wide variety of organic solvents known to the skilled artisan can be useful herein. Non-limiting examples of such suitable organic solvents can include but are not limited to N-methyl pyrrolidone (NMP), methyl ethyl ketone (MEK), acetone, diethyl ether, toluene, Dowanol PM, Butyl Cellosolve, and mixtures thereof. In a non-limiting embodiment, the friction-reducing coating composition can comprise water and an organic solvent, wherein said organic solvent is at least partially miscible with water.

In a non-limiting embodiment, the friction-reducing coating composition can be at least partially applied to at least one of the ink jet recordable substrate and the substantially nonporous material of the present invention. Application of said friction-reducing coating composition to said substrate and/or said material can employ a wide variety of known techniques. In alternate non-limiting embodiments, the techniques described previously herein for applying the substantially water-resistant coating to the ink jet recordable substrate can be used for application of the friction-reducing coating composition to the ink jet recordable substrate and/or the substantially nonporous material.

The amount of the substantially dry friction-reducing coating applied to the substrate/material, or "coat weight", is typically measured as coating weight per coated area. The coat weight can vary widely. In alternate non-limiting embodiments, the coat weight of the substantially dry friction-reducing coating can be at least 0.1 gram per square meter, or from greater than 0 to 50 grams per square meter, or from 1 gram per square meter to 15 grams per square meter.

In a non-limiting embodiment, the multilayer article of the present invention can include a 10 mil thick sheet of Teslin® comprising a substantially water-resistant coating composition, a 10 mil sheet of polyvinylchloride, a 10 mil thick sheet of polyvinylchloride, and a 2 mil thick sheet of polyvinylchloride comprising a friction-reducing coating composition. In a further non-limiting embodiment, the friction-reducing coating composition can comprise a polysiloxane and a styrene acrylic polymer.

In a non-limiting embodiment, the multilayer article of the present invention can include a magnetizable material. As used herein and the claims, the term "magnetizable material" means a material to which magnetic properties can be communicated. A wide variety of magnetizable materials are known to one skilled in the art. Known magnetizable materials are available in various forms such as but not limited to sheet, film, tape or stripe.

Magnetizable materials for use in the present invention can be selected from a variety of materials capable of being magnetized by a magnetic field. Suitable magnetizable materials can include but are not limited to oxide materials. Non-limiting examples of suitable oxide materials can include ferrous oxide, iron oxide, and mixtures thereof. In a non-limiting embodiment, the oxide particles can be present in a slurry formulation.

Suitable magnetizable materials for use in the present invention can include those known in the art which demonstrate performance characteristics such as but not limited to the ability to be encoded with sufficient ease, ability to encode a sufficient amount of information, and ability to be erased with sufficient resistance. In a non-limiting embodiment, the amount of information encoded onto the magnetizable material can be referred to as the number of stages or tracks. The number of stages or tracks can vary. In alternate non-limiting embodiments, the magnetizable material for use in the present invention can have at least one (1) track, or not more than six (6) tracks, or from three (3) to four (4) tracks.

In a non-limiting embodiment, the resistance to erasure can be referred to as "coercivity". In general, the higher the coercivity value, the greater the resistance to erasure. The coercivity value can vary. In alternate non-limiting embodiments, the magnetizable material for use in the present invention can have a coercivity of at least 200, or not more than 5000, or from 500 to 2500, or from 100 to 1500.

Non-limiting examples of suitable magnetizable materials for use in the present invention can include but are not limited to magnetic foils which are commercially available from JCP, Kurz, EMTEC and DuPont.

In a non-limiting embodiment, the magnetizable material can be at least partially connected to at least one or more materials selected from a protective material, a carrier material or an adhesive material. The protective material, carrier material and adhesive material can be selected from a wide variety of materials known in the art as useful for each function. Non-limiting examples of suitable protective materials can include but are not limited to PET (polyethylene terapthalate), polyester and combinations thereof. Non-limiting examples of carrier materials can include but are not limited to PET, polyester and combinations thereof. Non-limiting examples of suitable adhesive materials can include but are not limited to those recited herein.

In another non-limiting embodiment, the protective material can be at least partially connected to the magnetizable material, the magnetizable material can be at least partially connected to the carrier material, and the carrier material can be at least partially connected to the adhesive material.

In alternate non-limiting embodiments, the magnetizable material can be at least partially connected to an ink jet recordable substrate and/or at least one substantially nonporous material. Non-limiting examples of ink jet recordable substrates can include but are not limited to those previously recited herein. In a non-limiting embodiment, the ink jet recordable substrate can be a microporous substrate such as those previously recited herein. In a further non-limiting embodiment, the microporous substrate can be Teslin® printing sheet which is commercially available from PPG Industries, Incorporated. Non-limiting examples of suitable substantially nonporous materials can include but are not limited to those previously recited herein. In a non-limiting embodiment, the substantially nonporous material can be polyvinyl chloride.

The magnetizable material-containing multilayer article of the present invention can be prepared by various methods known in the art. In a non-limiting embodiment, the magnetizable material can be at least partially connected to at least one substantially nonporous material. Various application techniques suitable for at least partially connecting the magnetizable material to the substantially nonporous material are known to a skilled artisan. In a non-limiting embodiment, the magnetizable material can be at least partially connected using an adhesive material. Non-limiting examples of suitable adhesive materials can include but are not limited to a wide variety of adhesives known to the skilled artisan, such as but not limited to those previously recited herein. In a non-limiting embodiment, the adhesive material can be selected from thermal- or pressure-sensitive adhesives.

In a further non-limiting embodiment, the magnetizable material can be at least partially connected to the adhesive material, and the adhesive material can be at least partially connected to a surface of the microporous substrate and/or at least one substantially nonporous material.

In alternate non-limiting embodiments, the magnetizable material can be at least partially connected to a microporous substrate and/or at least one substantially nonporous material prior to, during, or following a conventional lamination process such as but not limited to the lamination process previously described herein.

In another non-limiting embodiment, the magnetizable material can be essentially flush with the surface of the microporous substrate and/or substantially nonporous material to which it can be connected.

In a non-limiting embodiment, a substantially water-resistant coating composition can be at least partially applied to the magnetizable material. In alternate non-limiting embodiments, the coating can be at least partially applied to the magnetizable material either prior to or following at least partially connecting the magnetizable material to a microporous substrate or a substantially nonporous material. In a further non-limiting embodiment, an adhesive material can be at least partially applied to the uncoated surface of the magnetizable material, and the adhesive-containing surface can be at least partially connected to the microporous substrate or substantially nonporous material. In alternate non-limiting embodiments, the substantially water-resistant coating composition can be at least partially applied to at least one of the magnetizable material, the microporous substrate and the substantially nonporous material. In still a further non-limiting embodiment, the substantially water-resistant coating composition can include that which is recited herein.

In a non-limiting embodiment, a friction reducing coating composition can be at least partially applied to the magnetizable material. In alternate non-limiting embodiments, the coating can be at least partially applied to the magnetizable material either prior to or following at least partially connecting the magnetizable material to a micorporous substrate or a substantially nonporous material. In a further non-limiting embodiment, an adhesive material can be at least partially applied to the uncoated surface of the magnetizable material, and the adhesive-containing surface can be at least partially connected to the microporous substrate or substantially nonporous material. In alternate non-limiting embodiments, the friction reducing coating composition can be at least partially applied to at least one of the magnetizable material, the microporous substrate, and substantially nonporous material. In still a further non-limiting embodiment, the substantially friction reducing coating composition can include that which is recited herein.

The coating compositions can be applied by a variety of methods known in the art. In alternate non-limiting embodiments, the coating compositions can be applied by the methods previously described herein.

In a further non-limiting embodiment, a multilayer article of the present invention can include a microporous substrate at least partially connected to a first substantially nonporous material; the first substantially nonporous material can be at least partially connected to a second substantially nonporous material; the second substantially nonporous material can be at least partially connected to a third substantially nonporous material; said third substantially nonporous material can include a magnetizable material. In a further non-limiting embodiment, the microporous substrate and/or substantially nonporous materials can be at least partially connected using an adhesive material which can be at least partially applied to at least one surface of the substrate and/or materials.

In another non-limiting embodiment, a release liner can be at least partially connected to at least one surface of the multilayer article of the present invention. The release liner can function as a barrier to essentially prevent or minimize damage of the article during the manufacture process. In a non-limiting embodiment, a coating residue can be deposited on the stainless steel equipment during the lamination process as a result of print-off. Deposition of the coating on the equipment can result in at least partial damage to the coated surface of the multilayer article. In alternate non-limiting embodiments, a release liner can be at least partially connected to a coated or uncoated magnetizable material, a coated or uncoated substantially nonporous material, and/or a coated or uncoated microporous substrate.

The release liner can be selected from a wide variety of materials known in the art to perform the above-stated function. In general, a material suitable for use as a release liner in the present invention can have at least one of the following characteristics: a melt temperature in excess of the lamination temperature, the ability to essentially not migrate into the material and an acceptable tear strength such that it can be pulled away with sufficient ease.

In a further non-limiting embodiment, the microporous substrate, the substantially non-porous material, and magnetizable-containing substantially non-porous material can be aligned in an essentially parallel configuration to form a stacked article.

In another non-limiting embodiment, the microporous substrate can be at least partially connected to the substantially nonporous material in the absence of an adhesive material. In another non-limiting embodiment, the substantially nonporous material can be at least partially connected to another substantially nonporous material in the absence of an adhesive material.

In another non-limiting embodiment, the multilayer article of the present invention can include a data transmittance/storage device. Such devices can vary widely. Suitable devices for use in the present invention can include those known in the art. In a non-limiting embodiment, the device can include an antenna, electronic chip and/or other related circuitry. In a further embodiment, the device can include a carrier material. The carrier material can be selected from a wide variety of materials known in the art. In a non-limiting embodiment, the carrier material can be a substantially nonporous material. Suitable substantially nonporous materials can include those previously recited herein. In a non-limiting embodiment, the carrier material can be polyvinylchloride.

In still a further embodiment, the device can include a barrier material on at least one side of the circuitry. A function of the barrier material can be to encompass the circuitry and provide a substantially flat surface on the outside of the device. The barrier material can be selected from a wide variety of materials known in the art. In a non-limiting embodiment, the barrier material can be a substantially nonporous material. Suitable substantially nonporous materials can include those previously recited herein. In a non-limiting embodiment, the barrier material can be polyvinylchloride.

In a non-limiting embodiment, the multilayer article of the present invention can include an ink jet recordable substrate, a data transmittance/storage device, and at least one substantially nonporous material. The ink jet recordable substrate can be selected from a wide variety of such materials known in the art. Suitable non-limiting examples can include those previously described herein. In a non-limiting embodiment, the ink jet recordable substrate can be a microporous substrate such as those previously recited herein. In a further non-limiting embodiment, the ink jet recordable substrate can be Teslin® printing sheet which is commercially available from PPG Industries, Incorporated. As previously described herein, the ink jet recordable substrate can be at least partially coated on at least one surface or uncoated. Suitable coating compositions can include those previously described herein. In a non-limiting embodiment, a substantially water-resistant coating composition can be at least partially applied to the ink jet recordable substrate.

The substantially nonporous material can be selected from a wide variety of such materials known in the art. Suitable non-limiting examples of substantially nonporous materials can include those previously described herein. In a non-limiting embodiment, the substantially nonporous material can be polyvinylchloride. As previously described herein, the substantially nonporous material can be at least partially coated on at least one surface or uncoated. Suitable coating compositions can include those previously described herein. In a non-limiting embodiment, a friction-reducing coating composition can be at least partially applied to the substantially nonporous material.

In a further non-limiting embodiment, the data transmittance/storage device can be at least partially connected to the barrier material using an adhesive material. A wide variety of suitable adhesive materials and methods of application are known in the art. Non-limiting examples include those adhesive materials and methods of application previously described herein.

In another non-limiting embodiment, the barrier material can have at least one surface at least partially coated with a coating composition. Suitable coating compositions can include those previously described herein. In a non-limiting embodiment, a friction-reducing coating composition can be at least partially applied to the barrier material.

In a non-limiting embodiment, the multilayer article with magnetizable material or with a transmittance/storage device, can have a thickness that varies widely. In alternate non-limiting embodiments, the thickness of the article can be at least 10 mils, or less than 60 mils, or from 30 to 50 mils.

The multilayer article with magnetizable material or with a data transmittance/storage device can be useful in a wide variety of applications. In alternate non-limiting embodiments, it can be used in applications related to security access, access-control, data storage and data transmittance.

The multilayer article of the present invention has many and varied uses including gaskets, cushion assemblies, signs, cards, printing substrates, substrates for pen and ink drawings, maps (particularly maritime maps), book covers, book pages, wall coverings, and seams, joints, and seals of breathable packages.

The multilayer article of the present invention can be useful for the purpose of decorating or identifying the substantially nonporous material, or imparting to the substantially nonporous material unique properties of the substrate surface. The ink jet recordable substrate can be decorated with a variety of methods including: offset/lithographic printing, flexographic printing, painting, gravure printing, inkjet printing, electrophotographic printing, sublimation printing, thermal transfer printing, and screen printing. Decorating can also include applying a single or multilayer coating to the ink jet recordable substrate via normal coating methods known in the art. In general, the unique properties that an ink jet recordable substrate can impart on a substantially nonporous material include, but are not limited to one or more of: improved surface energy, increased porosity, decreased porosity, increased bond strength of post coat layer, and modification of the polymer's surface texture or pattern.

Polymer processing techniques are disclosed in U.S. Pat. No. 4,892,779, which is incorporated herein by reference.

The present invention is more particularly described in the following examples, which are intended to be illustrative only, since numerous modifications and variations therein will be apparent to those skilled in the art. Unless otherwise specified, all parts and percentages are by weight and all references to water are meant to be deionized water.

EXAMPLES

Example 1

A coating composition of the present invention was prepared by diluting in a stainless steel mix tank under high speed mixing with an overhead mixer, a 61.5% solids by weight anionic polyurethane dispersion sold under the trade name WitcoBond® 234 available from Crompton Corporation, Greenwich, Conn., to 9.22% solids by weight. In a separate feed tank a 55% solids by weight solution of a polyamide amine reacted with epichlorohydrin sold under the trade name CinFix NF by Stockhausen GmbH & Co. KG, Krefeld, Germany, was diluted to 5.78% solids by weight, and subsequently added to the diluted anionic polyurethane dispersion, and the mixture was mixed for 15 minutes. The pH was adjusted with glacial acetic acid to 5.0±0.5. The total resin solids of the mixture was 7.5% and the viscosity of the mixture was 46 cps as measured using a Brookfield viscometer, RVT, spindle no. 1, at 50 rpm and 25° C.

Examples 2–4

Coating compositions were prepared as described in Example 1 and applied to microporous substrates sold under the tradename Teslin® by PPG Industries, Pittsburgh, Pa. A sheet of 8.5"×11", 10 mil thick, Teslin® was placed on a 15"×20"×20 mil backing sheet. A metering bar was placed 1–2 inches above the Teslin® sheet, parallel to the top edge. A 10–20 ml quantity of coating was drawn into a disposable plastic syringe. The coating was deposited as a bead strip (approximately ⅛ inches wide) directly next to and touching the metering bar. The bar was drawn completely across the sheet of Teslin®, attempting a continuous/constant rate. The resultant wet sheet was placed in a forced air oven, secured and dried at 95° C. for 2 minutes. The dried sheet was removed from the oven and the same coating procedure was repeated on the opposite side of the sheet. The sheet was then printed and tested. Table 1 shows characteristics of the printed sheets. The coating compositions were applied with an approximate coat weight of 0.73 g/m$^2$ (total front and back). As used herein and the claims, "coat weight" refers to the consumption rate of coating (as dry solids) per unit area. For example, the coat weight of "X" grams of coating (as dry solids) consumed in coating "Y" square meters of Teslin®, is "X divided by Y" grams per square meter.

TABLE 1

|  | Substrate | Polyurethane | Meyer Bar |
|---|---|---|---|
| Example 2 | Teslin ® SP1000 | WitcoBond UCK 051 | #6 Rod |
| Example 3 | Teslin ® TS1000 | WitcoBond UCK 051 | #9 Rod |
| Example 4 | Teslin ® TS1000 | WitcoBond 234 | #9 Rod |

Examples 2–4 were printed with an ink jet printer, Model HP960 by Hewlett Packard Company, Palo Alto, Calif. and soaked overnight in water at ambient temperature. Based on visual inspection, it appeared that the recorded images remained intact, i.e., the ink did not bleed and the optical density of the image was not significantly decreased.

Examples 5–8

A coating composition was prepared as described in Example 1 and applied to Teslin® microporous substrates. Two substrates (Examples 5 and 7) were coated using a metering bar as described in Example 2. For coating compositions having a total resin solids of 7.5%, the viscosity was 46 cps; and for 10.0% solids, the viscosity was 63 cps. The viscosity values were measured using a Brookfield viscometer, RVT, spindle no. 1, at 50 rpm and 25° C.

Two substrates (Examples 6 and 8) were coated using a flexographic or gravure coating method to apply the coating. In this coating method, a line consisting of two coating stations, each with a forced air drying oven was used. Each coating station consists of a coating feed chamber, anilox roll and rubber application roll. The coating feed chamber was supplied from a coating holding tank and pump. Both sides of the Teslin® sheet were coated. The apparatus was fitted with a 7 BCM (billion cubic microns) anilox roll, line speed was 180 fpm, oven temperature was 105° C. (220° F.) and 8 passes per roll were made, which translates into four passes per surface. The coating compositions were applied with an approximate coat weight of 0.73 g/m$^2$ (total front and back).

Table 2 shows the characteristics of the sheets produced.

TABLE 2

|  | Substrate | Polyurethane | Coating Method | Total Resin Solids % |
|---|---|---|---|---|
| Example 5 | Teslin ® TS1000 | WitcoBond 234 | Meyer #9 Rod | 7.5 |
| Example 6 | Teslin ® TS1000 | WitcoBond 234 | 7 BCM Anilox (5 BPS*) | 7.5 |

TABLE 2-continued

| | Substrate | Polyurethane | Coating Method | Total Resin Solids % |
|---|---|---|---|---|
| Example 7 | Teslin ® TS1000 | WitcoBond 234 | Meyer #9 Rod | 10.0 |
| Example 8 | Teslin ® TS1000 | WitcoBond 234 | 7 BCM Anilox (4 BPS*) | 10.0 |

*BPS = Bumps Per Surface

The resultant coated sheets were printed with a test print pattern on a Model HP970 (Hewlett Packard Company) ink jet printer. Color bars from the test print pattern were measured for optical density by submerging in deionized water at ambient temperature for a period of 15 minutes, removing from the water and allowing to air dry for one hour and measuring each color for optical density. The optical density of cyan(C), magenta (M), yellow, black (K) and composite black (CMY) were measured using a Model RD922, MacBeth ANSWER II densitometer, manufactured by Kolimorgen Instrument Corporation, before and after water soak. The results are shown in Table 3.

TABLE 3

| | Initial Optical Density[1] | | | | | Optical Density @ 15 Minute Water Soak | | | | |
|---|---|---|---|---|---|---|---|---|---|---|
| | CMY | C | M | Y | K | CMY | C | M | Y | K |
| Example 5 | 1.34 | 1.04 | 1.08 | 0.76 | 1.37 | 1.33 | 1.07 | 1.04 | 0.81 | 1.42 |
| Example 6 | 1.33 | 0.99 | 1.03 | 0.73 | 1.33 | 1.34 | 1.07 | 1.06 | 0.78 | 1.37 |
| Example 7 | 1.36 | 1.04 | 1.09 | 0.77 | 1.38 | 1.33 | 1.05 | 1.02 | 0.79 | 1.37 |
| Example 8 | 1.21 | 1.11 | 1.19 | 0.87 | 1.20 | 1.23 | 1.18 | 1.19 | 0.92 | 1.22 |

Example 9

A 9.22% solids by weight solution of WitcoBond 234 was applied to a Teslin® TS1000 substrate using a metering bar as described in Examples 2–4. Immediately thereafter, a 5.78% solids by weight solution of CinFix NF was similarly applied to the substrate. The coated Teslin® TS1000 was then dried at 95° C. for 2 minutes. The dried sheet was removed from the oven and the same coating procedure was repeated on the opposite side of the sheet. A test print pattern was printed on the coated Teslin® using an HP970 Inkjet Printer as described in Examples 5–8. Based on visual inspection, the printed image demonstrated excessive ink bleeding and poor drying properties.

Example 10

A 5.78% solids by weight solution of CinFix NF was applied to a Teslin® TS1000 substrate as described in Examples 2–4. Immediately thereafter, a 9.22% solids by weight solution of WitcoBond 234 was similarly applied to the substrate. The coated Teslin® TS1000 was then dried at 95° C. for 2 minutes. The dried sheet was removed from the oven and the same coating procedure was repeated on the opposite side of the sheet. A test print pattern was printed on the coated Teslin® using an HP970 Inkjet Printer as described in Examples 5–8. Based on visual inspection, the printed image demonstrated excessive ink bleeding and poor drying properties.

Example 11

A 5.78% solids by weight solution of CinFix NF was applied to a Teslin® TS1000 substrate as described in Examples 2–4. The coated Teslin® TS1000 was then dried at 95° C. for 2 minutes. The dried sheet was removed from the oven and the same coating procedure was repeated on the opposite side of the sheet. A test print pattern was printed on the coated Teslin® using an HP970 Inkjet Printer as described in Examples 5–8. Based on visual inspection, the printed image was acceptable, however, the printed substrate demonstrated poor water resistance.

Example 12

A 9.22% solids by weight solution of WitcoBond 234 was applied to a Teslin® TS1000 substrate as described in Examples 2–4. The coated Teslin® TS1000 was then dried at 95° C. for 2 minutes. The dried sheet was removed from the oven and the same coating procedure was repeated on the opposite side of the sheet. A test print pattern was printed on the coated Teslin® using an HP970 Inkjet Printer as described in Examples 5–8. Based on visual inspection, the printed image demonstrated unacceptable print quality.

Example 13

A coating composition was prepared by diluting in a stainless steel mix tank under high speed mixing with an overhead mixer, a 61.5% solids by weight anionic polyurethane dispersion sold under the trade name WitcoBond® 234 available from Crompton Corporation, Greenwich, Conn., to 9.22% solids by weight. In a separate feed tank a 55% solids by weight solution of a polyamide amine reacted with epichlorohydrin sold under the trade name CinFix NF by Stockhausen GmbH & Co. KG, Krefeld, Germany, was diluted to 5.78% solids by weight. The WitcoBond 234 dispersion was added to the diluted CinFix NF solution. The resulting suspension demonstrated an unacceptably heavy precipitate which was a polysalt of the CinFix NF and WitcoBond 234.

Examples 14–16

Coating compositions were prepared as in Example 1 and were applied to silk fabric (0.10 lb/sq yd, 5 mil gauge), cotton fabric (0.34 lb/sq yd, 13.6 mil gauge) and a polypropylene/cellulose nonwoven substrate (0.14 lb/sq yd, 9.5 mil gauge). For each material coated, a sheet (8.5"×11") was fixed to a 15"×20"×20 mil backing sheet. A metering bar was placed 1–2 inches above the top of the sheet, parallel to the top edge. A 10–20 ml quantity of coating was drawn into a disposable plastic syringe. The coating was deposited as a bead strip (approximately ⅛ inches wide) directly next to and touching the metering bar. The bar was drawn completely across the sheet at a continuous/constant rate. The resultant wet sheet was placed in a forced air oven, secured and dried at 95° C. for 2 minutes. The dried sheet was removed from the oven and the same coating procedure was repeated on the opposite side of the sheet. The sheet was then taped to a transparency sheet to provide rigidity and was then ready to be printed and tested. The coating compositions were applied with an approximate coat weight of 0.73 g/m$^2$ (total front and back). Coat weight was determined as previously described in Examples 2–4.

Examples 14–16 were printed with an ink jet printer, Model HP970 by Hewlett Packard Company, Palo Alto, Calif. and compared to the same substrates without coating. After printing, each sheet was removed from the rigid transparency sheet. Coated and uncoated printed sheet types were soaked in water at ambient temperature for 5 days. Optical density was measured after 5 days of soaking. The optical density of cyan (C), magenta (M), yellow (Y), black (K) and composite black (CMY), were measured using a Model RD922, MacBeth ANSWER II Densitometer, manufactured by Kolimorgen Instrument Corporation, before and after water soak.

The recorded images for the coated substrates remained intact after 15 minutes, i.e., the ink did not bleed or the optical density of the image was not significantly decreased for each sample. The uncoated sheets bled immediately, completely washing away the printed image within the 15 minute soak time. The printed image on each of the coated substrate did experience ink bleed after 5 day water soak exposure, as seen by the optical density values. The resultant printed images were faded but had good line sharpness and legible text.

addition. The resulting mixture contained 40 parts by weight of solids of CinFix NF and 60 parts by weight of solids of Witcobond W-234.

A second coating was prepared as above-described with the exception that CinFix NF was replaced on an equivalent dry solids basis with CinFix RDF. This second coating composition is referred to herein as 01/RDF. CinFix RDF is a water solution of poly(diallyl dimethyl ammonium chloride) at 31% solids commercially available from Stockhausen GmbH & Co. KG, Krefeld, Germany. The CinFix RDF was diluted to 10.0% solids by weight prior to addition to the Witcobond W-234.

A third coating was prepared as above-described for the "01" composition with the exception that CinFix NF was replaced on an equivalent dry solids basis with diallyldimethylammonium chloride. This third coating composition is referred to herein as "01/DADMAC". Diallyldimethyl ammonium chloride is commercially available from Aldrich Chemical Company of Milwaukee, Wis., as a 65% solution in water. It was diluted to 10.0% solids by weight prior to addition to the Witcobond W-234.

A fourth coating was prepared as above-described for the "01" composition with the exception that CinFix NF was replaced on an equivalent dry solids basis with the reaction product of equimolar amounts of diethyl amine and epichlorohydrin at 30% solids in water. This fourth coating composition is referred to herein as "01/DEA-EPI". The reaction product was not completely miscible with water in the 30/70 parts by weight mix necessary for 30% solids and therefore, was acidified to a pH of 5 with acetic acid to render it soluble in water for use in the coating. It was diluted to 10.0% solids prior to addition to the Witcobond W-234.

|  | Initial Optical Density | | | | | Optical Density @ 5 day Water Soak | | | | |
| --- | --- | --- | --- | --- | --- | --- | --- | --- | --- | --- |
|  | CMY | C | M | Y | K | CMY | C | M | Y | K |
| Example 14 | 1.23 | 1.04 | 1.24 | 1.08 | 1.24 | 0.87 | 0.71 | 0.62 | 0.55 | 0.80 |
| Silk (uncoated) | 0.97 | 0.84 | 0.88 | 0.72 | 0.95 | Color bars washed out/not measurable | | | | |
| Example 15 | 1.26 | 1.13 | 1.31 | 1.11 | 1.27 | 0.81 | 0.69 | 0.76 | 0.54 | 0.92 |
| Cotton (uncoated) | 0.94 | 0.81 | 0.91 | 0.81 | 0.95 | Color bars washed out/not measurable | | | | |
| Example 16 | 1.42 | 1.19 | 1.46 | 1.11 | 1.46 | 1.14 | 0.89 | 0.67 | 0.58 | 1.21 |
| Polypropylene/ Cellulose (uncoated) | 1.26 | 1.15 | 1.43 | 1.06 | 1.29 | Color bars washed out/not measurable | | | | |

Example 17

A coating composition designated herein as "01" was prepared as follows. In a mixing vessel under high speed mixing with an overhead mixer, a 61.5% solids by weight anionic polyurethane dispersion sold under the trade name Witcobond W-234 available from Crompton Corporation, Greenwich, Conn., was diluted with deionized water to a 10.0% solids by weight dispersion. In a separate vessel, a 55% solids by weight solution of a polyamide amine reacted with epichlorohydrin sold under the trade name CinFix NF available from Stockhausen GmbH & Co. KG, Krefeld, Germany, was diluted with deionized water to a 10.0% solids by weight solution, and was subsequently added to the diluted anionic polyurethane dispersion. The mixture was mixed for fifteen minutes following completion of the Sheets of Teslin® TS1000 and SP1000 were coated on both sides with each of the above-mentioned coatings using a #9 rod. The coating was applied to the front surface, dried for a period of two minutes at a temperature of 95° C., and then applied to the back surface and dried for two minutes at 95° C. The finished sheets were then printed with a pattern on a Hewlett-Packard 960C printer at "HP Premium Photo Paper—Glossy" setting. The color density of the printed color bar section of the pattern was measured using an X-Rite Model 418 Densitometer, calibrated on a white tile standard. The printed color bar section was cut out of each sheet and immersed in a beaker of de-ionized water overnight (i.e., 14 hours). The sections were then removed from the water baths and allowed to air dry for a period of four hours. The color density after soak was then measured.

The results are shown in the following table:

| Coating | Substrate | Soak | CMY | C-100 | M-100 | Y-100 | K-100 |
|---|---|---|---|---|---|---|---|
| "01" | TS1000 | No | 1.31 | 1.23 | 1.24 | 0.93 | 1.31 |
| "01" |  | Yes | 1.33 | 1.16 | 1.20 | 0.92 | 1.33 |
| "01" | SP1000 | No | 1.32 | 1.23 | 1.25 | 0.93 | 1.32 |
| "01" |  | Yes | 1.32 | 1.16 | 1.19 | 0.90 | 1.33 |
| "01/RDF" | TS1000 | No | 1.52 | 1.10 | 1.20 | 0.88 | 1.55 |
| "01/RDF" |  | Yes | 1.54 | 1.04 | 1.10 | 0.84 | 1.55 |
| "01/RDF" | SP1000 | No | 1.16 | 0.97 | 1.28 | 0.99 | 1.20 |
| "01/RDF" |  | Yes | 1.13 | 0.91 | 1.21 | 1.00 | 1.15 |
| "01/DADMAC" | TS1000 | No | 1.73 | 1.13 | 1.01 | 0.82 | 1.80 |
| "01/DADMAC" |  | Yes | 1.53 | 0.11 | 0.17 | 0.13 | 1.55 |
| "01/DADMAC" | SP1000 | No | 1.37 | 0.91 | 1.44 | 1.06 | 1.58 |
| "01/DADMAC" |  | Yes | 0.26 | 0.14 | 0.20 | 0.15 | 0.16 |
| "01/DEA-EPI" | TS1000 | No | 0.81 | 0.98 | 0.85 | 0.57 | 0.81 |
| "01/DEA-EPI" |  | Yes | 0.60 | 0.66 | 0.36 | 0.24 | 0.59 |
| "01/DEA-EPI" | SP1000 | No | 0.75 | 0.92 | 0.82 | 0.55 | 0.76 |
| "01/DEA-EPI" |  | Yes | 0.54 | 0.62 | 0.35 | 0.23 | 0.55 |

The "01" coating on either substrate exhibited acceptable color density and water resistance and there was no visual evidence of color bleed. Based on visual inspection, the printed images were crisp and clear. The "01/RDF" coating also demonstrated acceptable color density and water resistance, showing no visual bleed. However, based on visual inspection there was a slight "feathering" or blurring of the image on the SP1000 substrate. The "01/DADMAC" coating had high color density before the soak, but based on visual inspection, the inks did not completely dry on the surface and were almost completely removed from both of the substrates during the soak. Further, based on visual inspection, the images were not distinct, there was significant color bleed and the images were not clear. The "01/DEA-EPI" coating had low color density on both substrates and the water resistance was poor. Based on visual inspection, there was no color bleed and the images were clear but appeared faded.

Example 18

Coating composition Wikoff SCW 4890, manufactured and supplied by Wikoff Industries was applied to a 2 mil Klockner ZE84 pvc substrate sold by Klockner corp. A 8.5"×11" sheet of 2 mil Klockner ZE84 was placed on a 15"×20"×20 mil backing sheet. A #9 metering bar was placed 1–2 inches above the top of the pvc sheet, parallel to the top edge. A 10–20 ml quantity of coating was drawn into a disposable plastic syringe. The coating was deposited as a bead strip (approximately ⅛ inches wide) directly next to and touching the Metering Bar. The bar was drawn completely across the sheet of pvc at a continuous/constant rate. The resultant wet sheet was placed in a forced air oven, secured and dried at 95° C. for 2 minutes. The sheet was then ready to be laminated and tested.

Example 19

The 2 mil coated pvc sheet prepared as described in Example 18 was fabricated into cards using the following procedure. One coated Teslin® sheet was placed on top of one 8.5-inch×11-inch sheet of 0.10-inch polyvinylchloride (PVC), supplied by Empire Plastics. The PVC sheet was cut in the grain long direction. Below the PVC ply was a second ply of 8.5-inch×11-inch×10 mil PVC, cut grain short. Below the 10 mil PVC grain short ply was the coated 8.5-inch× 11-inch×2 mil PVC sheet cut grain long, positioned with the coated surface facing away from the adjacent 10 mil pvc ply. A sheet 12-inch×12-inch of 2-mil clear polyester was placed over the Teslin® sheet to act as a release liner. This construction was placed between two 12"×12"×30 mil polished stainless steel metal plate. An identical polyester/treated Teslin® sheet/PVC/PVC/PVC lay-up was placed on top of a stainless plate from the existing construction. A polished metal plate was placed over the exposed polyester release liner. The pattern was repeated two more times so that four pre-pressed multi-layer plys existed in the stack. The resultant stack was placed between buffer pads. The buffer pads are a combination polyamide fiber and mechanical rubber, manufactured and supplied by Yamauchi Corporation, designed to more uniformally distribute temperature and press during thermal lamination. The resultant stack plus buffer pads was then placed between two slightly larger 125 mil un-polished non-corrosive metal plates. This entire construction, referred to as a book, was placed in a phi laminating press, preheated to 300° F. The composite construction was compression laminated at a pressure of 203 psi. The entire book was held under this condition for 30 minutes. Then while still under press, power to the platens was turned off long enough to allow the center plys of the book to reach 100° F. After being removed from the press, all four composite sheets were removed from the book. All four finished composite sheets had good integrity; any attempt to delaminate destroyed the Teslin® layer, which demonstrated a good adhesive and seamless bond between the Teslin® and the PVC. ISO7910 ID-1 cards were die cut from the each composite sheet. The finished cards from each composite sheet had good integrity and good lat flat. The resultant cards demonstrated non-blocking behavior and required slip performance.

| Card Slip Performance | | |
|---|---|---|
| Friction Force Measurements | Uncoated | 4890 |
| 1 kg load results (lb.) | 2.122 | 0.773 |
| Std dev. | 0.44 | 0.085 |
| % COV | 20.7 | 11.0 |

Example 20

One coated Teslin® sheet was placed on top of one 20-inch×25-inch sheet of 0.10-inch polyvinylchloride (PVC), supplied by Empire Plastics. The PVC sheet was cut in the grain long direction. Below the PVC ply was a second ply of 20-inch×25-inch×10 mil PVC, cut grain short. Below the 10 mil PVC grain short ply was a 20-inch×25-inch×2 mil PVC sheet of Klockner ZE84 cut grain long. A sheet 21-inch×26-inch of 2-mil clear polyester was placed over the Teslin® sheet to act as a release liner. This construction was placed between two 21"×26"×30 mil polished stainless steel metal plate. An identical polyester/treated Teslin® sheet/PVC/PVC/PVC lay-up was placed on top of a stainless plate from the existing construction. A polished metal plate was placed over the exposed polyester release liner. The pattern was repeated ten more times so that twelve pre-pressed multi-layer plys existed in the stack. The resultant stack was placed between buffer pads. The buffer pads are a combination polyamide fiber and mechanical rubber, manufactured and supplied by Yamauchi Corporation, designed to more uniformally distribute temperature and press during thermal lamination. The resultant stack plus buffer pads was then placed between two slightly larger 125 mil un-polished non-corrosive metal plates. This entire construction, referred to as a book, was placed in a TMP laminating press, preheated to 300° F. The composite construction was compression laminated at a pressure of 203 psi. The entire book was held under this condition until the middle ply's of the book reached a temperature of 261° F. Then while still under press, the platens were cooled long enough to allow the same center plys to reach 100° F. After being removed from the press, all twelve composite sheets were removed from the book. All twelve composite sheets were topically treated with static guard on the pvc surface. All twelve finished composite sheets had good integrity; any attempt to delaminate destroyed the Teslin® layer, which demonstrated a good adhesive and seamless bond between the Teslin® and the PVC. ISO7910 ID-1 cards were die cut using PMC high die equipment with the Teslin® surface facing the cutting blade of the die. The finished cards from each composite sheet had good integrity and good lat flat. The resultant cards blocked slightly and did not demonstrate required slip performance.

Example 21

One coated Teslin® sheet was placed on top of one 20-inch×25-inch sheet of 0.10-inch polyvinylchloride (PVC), supplied by Empire Plastics. The PVC sheet was cut in the grain long direction. Below the PVC ply was a second ply of 20-inch×25-inch×10 mil PVC, cut grain short. Below the 10 mil PVC grain short ply was a 20-inch×25-inch×2 mil PVC sheet of Klockner ZE84 cut grain long. A sheet 21-inch×26-inch of 2-mil clear polyester was placed over the Teslin® sheet to act as a release liner. This construction was placed between two 21"×26"×30 mil polished stainless steel metal plate. An identical polyester/treated Teslin® sheet/PVC/PVC/PVC lay-up was placed on top of a stainless plate from the existing construction. A polished metal plate was placed over the exposed polyester release liner. The pattern was repeated ten more times so that twelve pre-pressed multi-layer plys existed in the stack. The resultant stack was placed between buffer pads. The buffer pads are a combination polyamide fiber and mechanical rubber, manufactured and supplied by Yamauchi Corporation, designed to more uniformally distribute temperature and press during thermal lamination. The resultant stack plus buffer pads was then placed between two slightly larger 125 mil un-polished non-corrosive metal plates. This entire construction, referred to as a book, was placed in a TMP laminating press, preheated to 300° F. The composite construction was compression laminated at a pressure of 203 psi. The entire book was held under this condition until the middle ply's of the book reached a temperature of 261 F. Then while still under press, the platens were cooled long enough to allow the same center plys to reach 100° F. After being removed from the press, all twelve composite sheets were removed from the book. All twelve composite sheets were topically treated with static guard on the pvc surface. All twelve finished composite sheets had good integrity; any attempt to delaminate destroyed the Teslin® layer, which demonstrated a good adhesive and seamless bond between the Teslin® and the PVC. ISO7910 ID-1 cards were die cut using PMC high die equipment with the pvc surface facing the cutting blade of the die. The finished cards from each composite sheet had good integrity and good lat flat. The resultant cards demonstrated non-blocking behavior and required slip performance.

TABLE 1

Card Cutting Comparison

| Card Type | 1 kg Friction Force (lb.) | Standard Deviation | % COV |
|---|---|---|---|
| Lot #0022 (Teslin ® up) | 0.990 | 0.231 | 23.3 |
| Lot #0022 (PVC up) | 0.789 | 0.097 | 12.3 |

Example 22

Coating composition Wikoff SCW 4890, manufactured and supplied by Wikoff Industries was applied to 300 ft of 2 mil Klockner ZE84 pvc sheet using a flexographic or gravure coating method. A single coating station was fixtured with a 6 bcm anilox roll and non-textured rubber application roll. The coating feed chamber was supplied from a coating holding tank and pump. Continuous roll stock was threaded through the equipment so that the coated sheet passed through a drying oven, with the coated surface facing the hot air source. The line speed was 200 fpm, oven temperature was 105° C. (220° F.) and a single coating pass was applied. The coating composition was applied with an approximate coat weight of 6.1 mg/sqin. The resultant coated roll was converted into 20"×25" sheets, grain long.

Example 23

Coating composition Wikoff SCW 4890, manufactured and supplied by Wikoff Industries was applied to 300 ft of 2 mil Klockner ZE84 pvc sheet using a flexographic or gravure coating method. A single coating station was fixtured with a 6 bcm anilox roll and non-textured rubber application roll. The coating feed chamber was supplied from a coating holding tank and pump. Continuous roll stock was threaded through the equipment so that the coated sheet passed through a drying oven, with the coated surface facing the hot air source. The line speed was 200 fpm, oven temperature was 105° C. (220° F.) and a single coating pass was applied. The resultant roll was then passed through the equipment using the same procedure for a second coating treatment on the same previously coated surface. The coating composition was applied with an approximate total coat weight of 12 mg/sqin. The resultant coated roll was converted into 20"×25" sheets, grain long.

Example 24

Coating composition Wikoff 1124, manufactured and supplied by Wikoff Industries was applied to 300 ft of 2 mil Klockner ZE84 pvc sheet using a flexographic or gravure coating method. A single coating station was fixtured with a 6 bcm anilox roll and non-textured rubber application roll. The coating feed chamber was supplied from a coating holding tank and pump. Continuous roll stock was threaded through the equipment so that the coated sheet passed through a drying oven, with the coated surface facing the hot air source. The line speed was 200 fpm, oven temperature was 105° C. (220° F.) and a single coating pass was applied. The coating composition was applied with an approximate coat weight of 6.1 mg/sqin. The resultant coated roll was converted into 20"×25" sheets, grain long.

Example 25

Coating composition Wikoff 1124, manufactured and supplied by Wikoff Industries was applied to 300 ft of 2 mil Klockner ZE84 pvc sheet using a flexographic or gravure coating method. A single coating station was fixtured with a 6 bcm anilox roll and non-textured rubber application roll. The coating feed chamber was supplied from a coating holding tank and pump. Continuous roll stock was threaded through the equipment so that the coated sheet passed through a drying oven, with the coated surface facing the hot air source. The line speed was 200 fpm, oven temperature was 105° C. (220° F.) and a single coating pass was applied. The resultant roll was then passed through the equipment using the same procedure for a second coating treatment on the same previously coated surface. The coating composition was applied with an approximate total coat weight of 12 mg/sqin. The resultant coated roll was converted into 20"×25" sheets, grain long.

Example 26

The 2 mil coated pvc sheet prepared as described in Example 22 was fabricated into cards using the following procedure. One coated Teslin® sheet was placed on top of one 20-inch×25-inch sheet of 0.10-inch polyvinylchloride (PVC), supplied by Empire Plastics. The PVC sheet was cut in the grain long direction. Below the PVC ply was a second ply of 20-inch×25-inch×10 mil PVC, cut grain short. Below the 10 mil PVC grain short ply was the coated 20-inch×25-inch×2 mil PVC sheet cut grain long, positioned with the coated surface facing away from the adjacent 10 mil pvc ply. A sheet 21-inch×26-inch of 2-mil clear polyester was placed over the Teslin® sheet to act as a release liner. This construction was placed between two 21"×26"×30 mil polished stainless steel metal plate. An identical polyester/treated Teslin® sheet/PVC/PVC/PVC lay-up was placed on top of a stainless plate from the existing construction. A polished metal plate was placed over the exposed polyester release liner. The pattern was repeated ten more times so that twelve pre-pressed multi-layer plys existed in the stack. The resultant stack was placed between buffer pads. The buffer pads are a combination polyamide fiber and mechanical rubber, manufactured and supplied by Yamauchi Corporation, designed to more uniformly distribute temperature and press during thermal lamination. The resultant stack plus buffer pads was then placed between two slightly larger 125 mil un-polished non-corrosive metal plates. This entire construction, referred to as a book, was placed in a TMP laminating press, preheated to 300° F. The composite construction was compression laminated at a pressure of 203 psi. The entire book was held under this condition until the middle ply's of the book reached a temperature of 261° F. Then while still under press, the platens were cooled long enough to allow the same center plys to reach 100° F. After being removed from the press, all twelve composite sheets were removed from the book. All twelve finished composite sheets had good integrity; any attempt to delaminate destroyed the Teslin® layer, which demonstrated a good adhesive and seamless bond between the Teslin® and the PVC. ISO7910 ID-1 cards were die cut from the each of the 20-inch×25-inch×30.5 mil composite sheets. The finished cards from each composite sheet had good integrity and good lat flat. The resultant cards demonstrated non-blocking behavior and required slip performance.

Friction Force Test Method

A card was fixed to a smooth flat base.

A second card was placed on top of the base card, with an offset of ½-inch over the long edge.

The second card was attached to a force gauge through a cable and pulley system. The force gauge was fixed to the travel arm of an instron.

A symmetrical weight was placed on the second card with the back edge of the weight centered and flush with the trailing edge of the second card.

The card pair was staged one (1) minute prior to pulling.

The top card was slid over the bottom card approximately 1.5-inch and the maximum pull force measured on the force gauge was recorded.

The procedure was repeated five (5) times, each time with a different card pair.

The average, standard deviation and % coefficient of variation of all six measurements were calculated and reported.

| Friction Force Measurements | Card Slip Performance | | | | |
|---|---|---|---|---|---|
| | Uncoated | 4890/1 pass | 4890/2 passes | 1124/1 pass | 1124/2 passes |
| 1 kg load results (lb.) | 1.33 | 1.105 | 0.984 | 1.058 | 1.221 |
| Std dev. | 0.073 | 0.192 | 0.068 | 0.062 | 0.108 |
| % COV | 5.5 | 17.4 | 6.9 | 5.9 | 8.8 |
| 200 g load results (lb.) | 0.284 | 0.179 | 0.144 | 0.192 | 0.188 |
| Std. Dev. | 0.036 | 0.027 | 0.014 | 0.025 | 0.019 |
| % COV | 12.6 | 15.1 | 9.79 | 13.1 | 10.3 |

Example 27

Coating composition Wikoff SCW 4890, manufactured and supplied by Wikoff Industries was applied to 14,000 ft of 2 mil Klockner ZE84 pvc sheet using a flexographic or gravure coating method. A single coating station was fixtured with a 6 bcm anilox roll and non-textured rubber application roll. The coating feed chamber was supplied from a coating holding tank and pump. Continuous roll stock was threaded through the equipment so that the coated sheet passed through a drying oven, with the coated surface facing the hot air source. The line speed was 200 fpm, oven temperature was 105° C. (220° F.) and a single coating pass was applied. A gentle curtain of air was directed towards the continuous coated sheet just prior to the wind-up station to eliminate folds and wringles. The coating composition was applied with an approximate coat weight of 6.1 mg/sqin. The resultant coated roll was converted into 20"×25" sheets, grain long.

Example 28

The 2 mil coated pvc sheet prepared as described in Example 27 was fabricated into cards using the following procedure. One coated Teslin® sheet was placed on top of one 20-inch×25-inch sheet of 0.10-inch polyvinylchloride (PVC), supplied by Empire Plastics. The PVC sheet was cut in the grain long direction. Below the PVC ply was a second ply of 20-inch×25-inch×10 mil PVC, cut grain short. Below the 10 mil PVC grain short ply was the coated 20-inch×25-inch×2 mil PVC sheet cut grain long, positioned with the coated surface facing away from the adjacent 10 mil pvc ply. A sheet 21-inch×26-inch of 2-mil clear polyester was placed over the Teslin® sheet to act as a release liner. This construction was placed between two 21"×26"×30 mil polished stainless steel metal plate. An identical polyester/treated Teslin® sheet/PVC/PVC/PVC lay-up was placed on top of a stainless plate from the existing construction. A polished metal plate was placed over the exposed polyester release liner. The pattern was repeated ten more times so that twelve pre-pressed multi-layer plys existed in the stack. The resultant stack was placed between buffer pads. The buffer pads are a combination polyamide fiber and mechanical rubber, manufactured and supplied by Yamauchi Corporation, designed to more uniformly distribute temperature and press during thermal lamination. The resultant stack plus buffer pads was then placed between two slightly larger 125 mil un-polished non-corrosive metal plates. This entire construction, referred to as a book, was placed in a TMP laminating press, preheated to 300° F. The composite construction was compression laminated at a pressure of 203 psi. The entire book was held under this condition until the middle ply's of the book reached a temperature of 261° F. Then while still under press, the platens were cooled long enough to allow the same center plys to reach 100° F. After being removed from the press, all twelve composite sheets were removed from the book. All twelve finished composite sheets had good integrity; any attempt to delaminate destroyed the Teslin® layer, which demonstrated a good adhesive and seamless bond between the Teslin® and the PVC. ISO7910 ID-1 cards were die cut from the each of the 20-inch×25-inch×30.5 mil composite sheets. The finished cards from each composite sheet had good integrity and good lat flat. The resultant cards demonstrated non-blocking behavior and required slip performance.

| Card Slip Performance | |
| --- | --- |
| Friction Force Measurements | Production Scale Sample 4890/6 bcm/1pass |
| 1 kg Load Result (lb.) | 0.881 |
| Std dev. | 0.106 |
| % COV | 11.99 |

Example 29

Coating composition Wikoff SCW 4890, manufactured and supplied by Wikoff Industries was applied to a 2 mil Klockner ZE84 pvc substrate sold by Klockner corp. A 8.5"×11" sheet was placed on a 15"×20"×20 mil backing sheet. A metering bar was placed 1–2 inches above the top of the pvc sheet, parallel to the top edge. A 10–20 ml quantity of coating was drawn into a disposable plastic syringe. The coating was deposited as a bead strip (approximately ⅛ inches wide) directly next to and touching the #9 Metering Bar. The bar was drawn completely across the sheet of pvc at a continuous/constant rate. The Resultant wet sheet was placed in a forced air oven, secured and dried at 95° C. for 2 minutes. The sheet was then ready to be laminated and tested.

Example 30

Coating composition Wikoff SCW 4890, manufactured and supplied by Wikoff Industries was applied to a 2 mil Klockner ZE84 pvc substrate sold by Klockner corp. A 8.5"×11" sheet was placed on a 15"×20"×20 mil backing sheet. A metering bar was placed 1–2 inches above the top of the pvc sheet, parallel to the top edge. A 10–20 ml quantity of coating was drawn into a disposable plastic syringe. The coating was deposited as a bead strip (approximately ⅛ inches wide) directly next to and touching the #0 Metering Bar. The bar was drawn completely across the sheet of pvc at a continuous/constant rate. The Resultant wet sheet was placed in a forced air oven, secured and dried at 95° C. for 2 minutes. The sheet was then ready to be laminated and tested.

Example 31

The 2 mil coated pvc sheet prepared as described in Example 29 was fabricated into cards using the following procedure. One coated Teslin® sheet was placed on top of one 8.5-inch×11-inch sheet of 0.10-inch polyvinylchloride (PVC), supplied by Empire Plastics. The PVC sheet was cut in the grain long direction. Below the PVC ply was a second ply of 8.5-inch×11-inch×10 mil PVC, cut grain short. Below the 10 mil PVC grain short ply was the coated 8.5-inch× 11-inch×2 mil PVC sheet cut grain long, positioned with the coated surface facing away from the adjacent 10 mil pvc ply. A sheet 12-inch×12-inch of 2-mil clear polyester was placed over the Teslin® sheet to act as a release liner. This construction was placed between two 12"×12"×30 mil polished stainless steel metal plate. An identical polyester/treated Teslin® sheet/PVC/PVC/PVC lay-up was placed on top of a stainless plate from the existing construction. A polished metal plate was placed over the exposed polyester release liner. The pattern was repeated two more times so that four pre-pressed multi-layer plys existed in the stack. The resultant stack was placed between buffer pads. The buffer pads are a combination polyamide fiber and mechanical rubber, manufactured and supplied by Yamauchi Corporation, designed to more uniformly distribute temperature and press during thermal lamination. The resultant stack plus buffer pads was then placed between two slightly larger 125 mil un-polished non-corrosive metal plates. This entire construction, referred to as a book, was placed in a phi laminating press, preheated to 300° F. The composite construction was compression laminated at a pressure of 203 psi. The entire book was held under this condition for 30 minutes. Then while still under press, power to the platens was turned off long enough to allow the center plys of the book to reach 100° F. After being removed from the press, all four composite sheets were removed from the book. All four finished composite sheets had good integrity; any attempt to delaminate destroyed the Teslin® layer, which demonstrated a good adhesive and seamless bond between the Teslin® and the PVC. ISO7910 ID-1 cards were die cut from the each composite sheets. The finished cards from each composite sheet had good integrity and good lat flat. The resultant cards demonstrated non-blocking behavior and required slip performance.

Example 32

The 2 mil coated pvc sheet prepared as described in Example 30 was fabricated into cards using the following procedure. One coated® sheet was placed on top of one 8.5-inch×11-inch sheet of 0.10-inch polyvinylchloride (PVC), supplied by Empire Plastics. The PVC sheet was cut in the grain long direction. Below the PVC ply was a second ply of 8.5-inch×11-inch×10 mil PVC, cut grain short. Below the 10 mil PVC grain short ply was the coated 8.5-inch× 11-inch×2 mil PVC sheet cut grain long, positioned with the coated surface facing away from the adjacent 10 mil pvc ply. A sheet 12-inch×12-inch of 2-mil clear polyester was placed over the Teslin® sheet to act as a release liner. This construction was placed between two 12"×12"×30 mil polished stainless steel metal plate. An identical polyester/treated Teslin® sheet/PVC/PVC/PVC lay-up was placed on top of a stainless plate from the existing construction. A polished metal plate was placed over the exposed polyester release liner. The pattern was repeated two more times so that four pre-pressed multi-layer plys existed in the stack. The resultant stack was placed between buffer pads. The buffer pads are a combination polyamide fiber and mechanical rubber, manufactured and supplied by Yamauchi Corporation, designed to more uniformly distribute temperature and press during thermal lamination. The resultant stack plus buffer pads was then placed between two slightly larger 125 mil un-polished non-corrosive metal plates. This entire construction, referred to as a book, was placed in a phi laminating press, preheated to 300° F. The composite construction was compression laminated at a pressure of 203 psi. The entire book was held under this condition for 30 minutes. Then while still under press, power to the platens was turned off long enough to allow the center plys of the book to reach 100° F. After being removed from the press, all four composite sheets were removed from the book. All four finished composite sheets had good integrity; any attempt to delaminate destroyed the Teslin® layer, which demonstrated a good adhesive and seamless bond between the Teslin® and the PVC. ISO7910 ID-1 cards were die cut from the each composite sheets. The finished cards from each composite sheet had good integrity and good lat flat. The resultant cards demonstrated non-blocking behavior and required slip performance.

| Card Slip Performance | | | |
|---|---|---|---|
| Friction Force Measurements | Uncoated | 4890/9rod | 4890/0rod |
| 1 kg load results (lb.) | 2.12 | 0.917 | 0.770 |
| Std dev. | 0.44 | 0.114 | 0.085 |
| % COV | 20.7 | 12.4 | 11.0 |

Example 33

Coating composition Wikoff SCW 4890, manufactured and supplied by Wikoff Industries was applied to 150 ft of 2 mil Klockner ZE84 pvc sheet using a flexographic or gravure coating method. A single coating station was fixtured with a 6 bcm anilox roll and non-textured rubber application roll. The coating feed chamber was supplied from a coating holding tank and pump. Continuous roll stock was threaded through the equipment so that the coated sheet passed through a drying oven, with the coated surface facing the hot air source. The line speed was 200 fpm, oven temperature was 105° C. (220° F.) and a single coating pass was applied. A gentle curtain of air was directed towards the continuous coated sheet just prior to the wind-up station to eliminate folds and wringles. The coating composition was applied with an approximate coat weight of 6.1 mg/sqin. The resultant coated roll was converted into 20"×25" sheets, grain long.

Example 34

Coating composition Wikoff SCW 4890, manufactured and supplied by Wikoff Industries was applied to 150 ft of 2 mil Klockner ZE84 pvc sheet using a flexographic or gravure coating method. A single coating station was fixtured with a 5 bcm anilox roll and non-textured rubber application roll. The coating feed chamber was supplied from a coating holding tank and pump. Continuous roll stock was threaded through the equipment so that the coated sheet passed through a drying oven, with the coated surface facing the hot air source. The line speed was 300 fpm, oven temperature was 105° C. (220° F.) and a single coating pass was applied. A gentle curtain of air was directed towards the continuous coated sheet just prior to the wind-up station to eliminate folds and wringles. The coating composition was applied with an approximate coat weight of 5 mg/sqin. The resultant coated roll was converted into 20"×25" sheets, grain long.

Example 35

A coating composition consisting of 75parts Wikoff 1124 and 25 parts Wikoff SCW 4890, was applied to 150 ft of 2 mil Klockner ZE84 pvc sheet using a flexographic or gravure coating method. A single coating station was fixtured with a 5 bcm anilox roll and non-textured rubber application roll. The coating feed chamber was supplied from a coating holding tank and pump. Continuous roll stock was threaded through the equipment so that the coated sheet passed through a drying oven, with the coated surface facing the hot air source. The line speed was 300 fpm, oven temperature was 105° C. (220° F.) and a single coating pass was applied. A gentle curtain of air was directed towards the continuous coated sheet just prior to the wind-up station to eliminate folds and wringles. The coating composition was applied with an approximate coat weight of 5 mg/sqin. The resultant coated roll was converted into 20"×25" sheets, grain long.

Example 36

The 2 mil coated pvc sheet prepared as described in Example 33 was fabricated into cards using the following procedure. One coated Teslin® sheet was placed on top of one 20-inch×25-inch sheet of 0.10-inch polyvinylchloride (PVC), supplied by Empire Plastics. The PVC sheet was cut in the grain long direction. Below the PVC ply was a second ply of 20-inch×25-inch×10 mil PVC, cut grain short. Below the 10 mil PVC grain short ply was the coated 20-inch×25-inch×2 mil PVC sheet cut grain long, positioned with the coated surface facing away from the adjacent 10 mil pvc ply. A sheet 21-inch×26-inch of 2-mil clear polyester was placed over the Teslin® sheet to act as a release liner. This construction was placed between two 21"×26"×30 mil polished stainless steel metal plate. An identical polyester/treated Teslin® sheet/PVC/PVC/PVC lay-up was placed on top of a stainless plate from the existing construction. A polished metal plate was placed over the exposed polyester release liner. The pattern was repeated ten more times so that twelve pre-pressed multi-layer plys existed in the stack. The resultant stack was placed between buffer pads. The buffer pads are a combination polyamide fiber and mechanical rubber, manufactured and supplied by Yamauchi Corporation, designed to more uniformly distribute temperature and press during thermal lamination. The resultant stack plus buffer pads was then placed between two slightly larger 125 mil un-polished non-corrosive metal plates. This entire construction, referred to as a book, was placed in a TMP laminating press, preheated to 300° F. The composite construction was compression laminated at a pressure of 203 psi. The entire book was held under this condition until the middle ply's of the book reached a temperature of 261° F. Then while still under press, the platens were cooled long enough to allow the same center plys to reach 100° F. After being removed from the press, all twelve composite sheets were removed from the book. All twelve finished composite sheets had good integrity; any attempt to delaminate destroyed the Teslin® layer, which demonstrated a good adhesive and seamless bond between the Teslin® and the PVC. ISO7910 ID-1 cards were die cut from the each of the 20-inch×25-inch×30.5 mil composite sheets. The finished cards from each composite sheet had good integrity and good lat flat. The resultant cards demonstrated non-blocking behavior and required slip performance. Any attempt to delaminate destroyed the Teslin® layer, which demonstrated a good adhesive and seamless bond between the Teslin® and the PVC.

Example 37

The 2 mil coated pvc sheet prepared as described in Example 34 was fabricated into cards using the following procedure. One coated Teslin® sheet was placed on top of one 20-inch×25-inch sheet of 0.10 -inch polyvinylchloride (PVC), supplied by Empire Plastics. The PVC sheet was cut in the grain long direction. Below the PVC ply was a second ply of 20-inch×25-inch×10 mil PVC, cut grain short. Below the 10 mil PVC grain short ply was the coated 20-inch×25-inch×2 mil PVC sheet cut grain long, positioned with the coated surface facing away from the adjacent 10 mil pvc ply. A sheet 21-inch×26-inch of 2-mil clear polyester was placed over the Teslin® sheet to act as a release liner. This construction was placed between two 21"×26"×30 mil polished stainless steel metal plate. An identical polyester/treated Teslin® sheet/PVC/PVC/PVC lay-up was placed on top of a stainless plate from the existing construction. A polished metal plate was placed over the exposed polyester release liner. The pattern was repeated ten more times so that twelve pre-pressed multi-layer plys existed in the stack. The resultant stack was placed between buffer pads. The buffer pads are a combination polyamide fiber and mechanical rubber, manufactured and supplied by Yamauchi Corporation, designed to more uniformly distribute temperature and press during thermal lamination. The resultant stack plus buffer pads was then placed between two slightly larger 125 mil un-polished non-corrosive metal plates. This entire construction, referred to as a book, was placed in a TMP laminating press, preheated to 300° F. The composite construction was compression laminated at a pressure of 203 psi. The entire book was held under this condition until the middle ply's of the book reached a temperature of 261 F. Then while still under press, the platens were cooled long enough to allow the same center plys to reach 100° F. After being removed from the press, all twelve composite sheets were removed from the book. All twelve finished composite sheets had good integrity; any attempt to delaminate destroyed the Teslin® layer, which demonstrated a good adhesive and seamless bond between the Teslin® and the PVC. ISO7910 ID-1 cards were die cut from the each of the 20-inch×25-inch×30.5 mil composite sheets. The finished cards from each composite sheet had good integrity and good lat flat. The resultant cards demonstrated non-blocking behavior and required slip performance. Any attempt to delaminate destroyed the Teslin® layer, which demonstrated a good adhesive and seamless bond between the Teslin® and the PVC.

Example 38

The 2 mil coated pvc sheet prepared as described in example Example 35 was fabricated into cards using the following procedure. One coated Teslin® sheet was placed on top of one 20-inch×25-inch sheet of 0.10-inch polyvinylchloride (PVC), supplied by Empire Plastics. The PVC sheet was cut in the grain long direction. Below the PVC ply was a second ply of 20-inch×25-inch×10 mil PVC, cut grain short. Below the 10 mil PVC grain short ply was the coated 20-inch×25-inch×2 mil PVC sheet cut grain long, positioned with the coated surface facing away from the adjacent 10 mil pvc ply. A sheet 21-inch×26-inch of 2-mil clear polyester was placed over the Teslin® sheet to act as a release liner. This construction was placed between two 21"×26"×30 mil polished stainless steel metal plate. An identical polyester/treated Teslin® sheet/PVC/PVC/PVC lay-up was placed on top of a stainless plate from the existing construction. A polished metal plate was placed over the exposed polyester release liner. The pattern was repeated ten more times so that twelve pre-pressed multi-layer plys existed in the stack. The resultant stack was placed between buffer pads. The buffer pads are a combination polyamide fiber and mechanical rubber, manufactured and supplied by Yamauchi Corporation, designed to more uniformly distribute temperature and press during thermal lamination. The resultant stack plus buffer pads was then placed between two slightly larger 125 mil un-polished non-corrosive metal plates. This entire construction, referred to as a book, was placed in a TMP laminating press, preheated to 300° F. The composite construction was compression laminated at a pressure of 203 psi. The entire book was held under this condition until the middle ply's of the book reached a temperature of 261° F. Then while still under press, the platens were cooled long enough to allow the same center plys to reach 100° F. After being removed from the press, all twelve composite sheets were removed from the book. All twelve finished composite sheets had good integrity; any attempt to delaminate destroyed the Teslin® layer, which demonstrated a good adhesive and seamless bond between the Teslin® and the PVC. ISO7910 ID-1 cards were die cut from the each of the 20-inch×25-inch×30.5 mil composite sheets. The finished cards from each composite sheet had good integrity and good lat flat. The resultant cards demonstrated non-blocking behavior and required slip performance. Any attempt to delaminate destroyed the Teslin® layer, which demonstrated a good adhesive and seamless bond between the Teslin® and the PVC.

Example 39

One coated Teslin® sheet was placed on top of one 20-inch×25-inch sheet of 0.10-inch polyvinylchloride (PVC), supplied by Empire Plastics. The PVC sheet was cut in the grain long direction. Below the PVC ply was a second ply of 20-inch×25-inch×10 mil PVC, cut grain short. Below the 10 mil PVC grain short ply was a 20-inch×25-inch×2 mil PVC sheet of Klockner ZE84 cut grain long. A sheet 21-inch×26-inch of 2-mil clear polyester was placed over the Teslin® sheet to act as a release liner. This construction was placed between two 21"×26"×30 mil polished stainless steel metal plate. An identical polyester/treated Teslin® sheet/PVC/PVC/PVC lay-up was placed on top of a stainless plate from the existing construction. A polished metal plate was placed over the exposed polyester release liner. The pattern was repeated ten more times so that twelve pre-pressed multi-layer plys existed in the stack. The resultant stack was placed between buffer pads. The buffer pads are a combination polyamide fiber and mechanical rubber, manufactured and supplied by Yamauchi Corporation, designed to more uniformly distribute temperature and press during thermal lamination. The resultant stack plus buffer pads was then placed between two slightly larger 125 mil un-polished non-corrosive metal plates. This entire construction, referred to as a book, was placed in a TMP laminating press, preheated to 300° F. The composite construction was compression laminated at a pressure of 203 psi. The entire book was held under this condition until the middle ply's of the book reached a temperature of 261 F. Then while still under press, the platens were cooled long enough to allow the same center plys to reach 100° F. After being removed from the press, all twelve composite sheets were removed from the book. All twelve finished composite sheets had good integrity; any attempt to delaminate destroyed the Teslin® layer, which demonstrated a good adhesive and seamless bond between the Teslin® and the PVC. ISO7910 ID-1 cards were die cut from the each of the 20-inch×25-inch×30.5 mil composite sheets. The finished cards from each composite sheet had good integrity and good lat flat. The resultant cards did not demonstrated non-blocking behavior and required slip performance. Any attempt to delaminate destroyed the Teslin® layer, which demonstrated a good adhesive and seamless bond between the Teslin® and the PVC.

Example 40

One coated Teslin® sheet was placed on top of one 20-inch×25-inch sheet of 0.10-inch polyvinylchloride (PVC), supplied by Empire Plastics. The PVC sheet was cut in the grain long direction. Below the PVC ply was a second ply of 20-inch×25-inch×10 mil PVC, cut grain short. Below the 10 mil PVC grain short ply was a 20-inch×25-inch×2 mil PVC sheet of Klockner ZE84 cut grain long. A sheet 21-inch×26-inch of 2mil clear polyester was placed over the Teslin® sheet to act as a release liner. This construction was placed between two 21"×26"×30 mil polished stainless steel metal plate. An identical polyester/treated Teslin® sheet/PVC/PVC/PVC lay-up was placed on top of a stainless plate from the existing construction. A polished metal plate was placed over the exposed polyester release liner. The pattern was repeated ten more times so that twelve pre-pressed multi-layer plys existed in the stack. The resultant stack was placed between buffer pads. The buffer pads are a combination polyamide fiber and mechanical rubber, manufactured and supplied by Yamauchi Corporation, designed to more uniformly distribute temperature and press during thermal lamination. The resultant stack plus buffer pads was then placed between two slightly larger 125 mil un-polished non-corrosive metal plates. This entire construction, referred to as a book, was placed in a TMP laminating press, preheated to 300° F. The composite construction was compression laminated at a pressure of 203 psi. The entire book was held under this condition until the middle ply's of the book reached a temperature of 261 F. Then while still under press, the platens were cooled long enough to allow the same center plys to reach 100° F. After being removed from the press, all twelve composite sheets were removed from the book. All twelve composite sheets were topically treated with static guard on the pvc surface. All twelve finished composite sheets had good integrity; any attempt to delaminate destroyed the Teslin® layer, which demonstrated a good adhesive and seamless bond between the Teslin® and the PVC. ISO7910 ID-1 cards were die cut from the each of the 20-inch×25-inch×30.5 mil composite sheets. The finished cards from each composite sheet had good integrity and good lat flat. The resultant cards demonstrated non-blocking behavior and required slip performance. These cards did, however, block when placed in a 100 card stack following exposure to 24 hours, 85% RH, 55° C., under a 1 kg. load. Any attempt to delaminate destroyed the Teslin® layer, which demonstrated a good adhesive and seamless bond between the Teslin® and the PVC.

Lamination Plate Build-up & Friction Force vs. PVC Surface

| Sample ID | Treatment 2mil PVC surface treatment (Anilox Roll/Chemistry) | Initial 1 kg Friction Force (lb.) | Friction Force following 85% RH/55C/1 kg/24 hrs (lb.) | Build-up/ Lamination Cycles |
|---|---|---|---|---|
| Uncoated | Not Applicable | >2.0 | Cards Blocked | No residue/ build-up |
| 8181-92-01 | 6 bcm/solid roll/4890/1pass | 0.728 | 0.851 | Heavy/ 2cycles |
| 8181-92-02 | 5 bcm/solid roll/4890/1pass | 0.669 | 0.859 | Slight/ 3cycles |
| 8181-92-04 | 5 bcm/solid roll/75/25-1124/4890blend/ 1pass | 0.888 | 0.938 | Very Slight/ 3cycles |
| Lot #24 | Laminates topically treated with DMDTAC | 0.721 | Cards blocked | No residue/ build-up |

| Teslin ® Coating Method (25 Gallon Mix) | |
|---|---|
| Ingredients | Amounts |
| CinFix RDF | 13.46 kg |
| Deionized Water | 24.98 kg |
| PPG WC-71-2134 | 12.24 kg |
| Deionized Water | 16.74 kg |

-continued

Teslin® Coating Method (25 Gallon Mix)

| Ingredients | Amounts |
|---|---|
| Witcobond W240 | 12.17 kg |
| Deionized Water | 16.65 kg |

Mix Procedure

Added specified amount of CinFix RFD to the main mix container and stirred.

Added specified amount of DI water to the CinFix RFD and stirred for 10 minutes prior to the next premix addition. Continued to stir throughout the entire mix procedure.

Added specified amount of PPG WC-71-2134 to a premix container and stirred.

Added specified amount of DI water to the PPG WC-71-2134 and stirred for 10 minutes.

Added PPG WC-71-2134 premix to the main mix container.

Added specified amount of Witcobond W240 to a premix container and stirred.

Added specified amount of DI water to the PPG WC-71-2134 and stirred for 10 minutes.

Added Witcobond W240 premix to the main mix container.

Stirred the final mix for 15 minutes.

Measured/Monitored solids, pH and viscosity and made any necessary adjustments.

Coating composition given in a descriptive format:

Coating Description: 40 active parts CinFix RDF
30 active parts PPG WC-71-2134
30 active parts Witcobond W240
12.5% Total Mix Solids Example 42

A coating composition of the present invention was prepared by first diluting of an aqueous 35.7% polydiallyldimethylammonium chloride (polyDADMAC) solution sold under the trade name CinFix RDF available from Stockhausen GmbH & Co. KG, Krefeld, Germany to 12.5% with deionized water in a stainless steel or polyethylene mix vessel under mild agitation. Mild agitation defined by a medium pitch three lobed mixing head, the system at a mix-head to mix vessel diameter ratio of 1 to 3 and the mix-head spinning at 600–1000 rpm and appropriately positioned. In a separate mix container, a 27.3% aqueous cationic acrylic solution sold under the name WC-71-2143 available from PPG Industries, Inc. is diluted with deionized water to 12.5% and added to the main mix vessel containing pre-diluted CinFix RDF. In a separate mix container, a 29.6% aqueous cationic polyurethane dispersion sold under the trade name Witcobond W240 available from Crompton Corporation is diluted with deionized water to 12.5% and added to the main mix vessel containing the CinFix RDF and PPG WC-71-2143 mixture. The resultant coating composition is stirred for 15 minutes. The resultant pH was 5.5+/−0.5. The total solids of the composition was 12.5%. It had a viscosity of 17 seconds measured using a #2 Zahn cup at 20° C.

Example 43

Coating composition prepared as in Example 42 (Improved coating for card stock Teslin®, −09 coating, 12.5% solids) and was applied to a 500 ft roll of 10mil Teslin® SP1000 microporous substrate by a flexographic or gravure coating method. In this coating method, a line consisting of two coating stations, each with a forced air drying oven was used. Each coating station consists of a coating feed chamber, anilox roll and rubber application roll. The coating feed chambers were supplied from a coating holding tank and pump. Continuous roll stock was threaded through the equipment so that both side were coated during a single pass. Each coating station was fitted with a 5 BCM anilox roll. Successive passes were arranged so that both sheet surfaces contacted the other rubber roll at least once. A total of 4 coating passes were applied. The line speed was 240 fpm and oven temperatures were set at 105° C. (220° F). The coating composition was applied with an approximate coat weight of 0.81 g/m$^2$ (total front and back) The resultant roll was converted into 20"×25" sheets, grain long.

The present invention has been described with reference to the preferred embodiments. Obvious modifications and alterations will occur to others upon reading and understanding the detailed description. It is intended that the invention be construed as including all such modifications and alterations insofar as they come within the scope of appended claims or the equivalents thereof.

Example 44

A coating of Wikoff SCW 4890, manufactured and supplied from Wikoff Industries was applied to 3,660 feet of 2 mil gauge Magnetic Stripe Master Roll, manufactured and supplied from JCP, using a flexographic/gravure coating method. A single coating station was fitted with a 5 bcm anilox roll and non-textured rubber application roll. The coating feed chamber was supplied from a coating holding tank and pump. Continuous roll stock was threaded through the equipment such that the surface containing the magnetic stripe tape would receive the coating. Also the coated sheet passed through a drying oven, with the coated surface facing the hot air source. The line speed was 300 fpm; oven temperature was 105° C. (220° F.); and a single coating pass was applied. A gentle curtain of air was directed towards the continuous coated sheet just prior to the wind-up station to eliminate folds and wrinkles. The coating was applied with an approximate coat weight of 5 mg/sqin. The resultant coated roll was converted into 25"×20" sheets, grain short.

Example 45

The 2 mil coated Magnetic Stripe Master Sheet prepared as described in Example 44 was fabricated into cards using the following procedure. One coated Teslin® sheet was placed on top of one 20-inch×25-inch sheet of 0.10-inch polyvinylchloride (PVC), supplied by Empire Plastics. The PVC sheet was cut in the grain long direction. Below the PVC ply was a second ply of 20-inch×25-inch×10 mil PVC, cut grain long. Below the 10 mil PVC grain long ply was the coated 20-inch×25-inch×2 mil Magnetic Stripe Master Sheet cut grain short, positioned with the coated surface facing away from the adjacent 10 mil pvc ply. A sheet of 21-inch×26-inch of 2 mil clear polyester was placed over the Teslin® sheet and the 2 mil magnetic stripe master sheet to act as release liner. The polyester was commercially obtained from DuPont under the trade name Mylar. This construction was placed between two 21"×26"×30 mil polished stainless steel metal plate. An identical polyester/treated Teslin® sheet/PVC/PVC/Magnetic Stripe Master Sheet/polyester lay-up was placed on top of a stainless plate from the existing construction. A polished metal plate was placed over the exposed polyester release liner. The pattern was repeated ten more times so that twelve pre-pressed multi-layer plys existed in the stack. The resultant stack was placed between buffer pads. The buffer pads are a combination polyamide fiber and mechanical rubber, manufactured and supplied by Yamauchi Corporation, designed to more uniformally distribute temperature and pressure during thermal lamination. The resultant stack plus buffer pads was then placed between two slightly larger 125 mil un-polished non-corrosive metal plates. This entire construction, referred to as a book, was placed in a Thermal Plant Lamination Press which was manufactured by TMP in Cleveland, Ohio, preheated to a temperature of 300° F. The composite construction was compression laminated at a pressure of 203 psi. The entire book was held under this condition until the middle plies of the book reached a temperature of 261° F. While still hot, the press was released from the books for one minute; then the pressure was re-introduced. The platens were then cooled long enough to allow the same center plies to reach 100° F. After being removed from the press, all twelve composite sheets were removed from the book. The Mylar release liners were removed. The magnetic stripe tapes were visually inspected and found to be defect free. All twelve finished composite sheets had good integrity; any attempt to delaminate the multilayer article, destroyed the Teslin® layer, which demonstrated a good adhesive and seamless bond between the Teslin® and the PVC. ISO7910 ID-1 cards were die cut from the each of the 20-inch×25-inch×30.5 mil composite sheets. The finished cards from each composite sheet showed good integrity and good lat flat. The resultant cards demonstrated non-blocking behavior and slip performance.

Example 46

The 2 mil coated Magnetic Stripe Master Sheet prepared as described in Example 44 was fabricated into cards using the following procedure. One coated Teslin® sheet was placed on top of one 20-inch×25-inch sheet of 0.10-inch polyvinylchloride (PVC), supplied by Empire Plastics. The PVC sheet was cut in the grain long direction. Below the PVC ply was a second ply of 20-inch×25-inch×10 mil PVC, cut grain long. Below the 10 mil PVC grain long ply was the coated 20-inch×25-inch×2 mil Magnetic Stripe Master Sheet cut grain short, positioned with the coated surface facing away from the adjacent 10 mil pvc ply. A sheet 21-inch×26-inch of 2-mil clear polyester was placed over the Teslin® sheet to act as release liner. This construction was placed between two 21"×26"×30 mil polished stainless steel metal plate. An identical polyester/treated Teslin® sheet/PVC/PVC/Magnetic Stripe Master Sheet lay-up was placed on top of a stainless plate from the existing construction. A polished metal plate was placed over the exposed polyester release liner. The pattern was repeated ten more times so that twelve pre-pressed multi-layer plys existed in the stack. The resultant stack was placed between buffer pads. The buffer pads are a combination polyamide fiber and mechanical rubber, manufactured and supplied by Yamauchi Corporation, designed to more uniformly distribute temperature and press during thermal lamination. The resultant stack plus buffer pads was then placed between two slightly larger 125 mil un-polished non-corrosive metal plates. This entire construction, referred to as a book, was placed in a TMP laminating press, preheated to a temperature of 300° F. The composite construction was compression laminated at a pressure of 203 psi. The entire book was held under this condition until the middle plies of the book reached a temperature of 261° F. While still hot, the press was released from all books for one minute then the pressure was re-introduced. The platens were cooled long enough to allow the same center plies to reach a temperature of 100° F. After being removed from the press, all twelve composite sheets were removed from the book. The mylar release liner was removed from the Teslin® sheet. The magnetic stripe surface showed defects resulting from print-off of the Wikoff coating onto the lamination plate. All twelve finished composite sheets had good integrity; any attempt to delaminate the article resulted in destroying the Teslin® layer, which demonstrated a good adhesive and essentially seamless bond between the Teslin® and the PVC. ISO7910 ID-1 cards were die cut from the each of the 20-inch×25-inch×30.5 mil composite sheets. The finished cards from each composite sheet had good integrity and good lat flat. The resultant cards demonstrated non-blocking behavior and good slip performance.

Example 47

One coated Teslin® sheet was placed on top of one 20-inch×25-inch sheet of 0.10-inch polyvinylchloride (PVC), supplied by Empire Plastics. The PVC sheet was cut in the grain long direction. Below the PVC ply was a second ply of 20-inch×25-inch×10 mil PVC, cut grain long. Below the 10 mil PVC grain short ply was a 20-inch×25-inch×2 mil Magnetic Stripe Master Sheet cut grain short. A sheet 21-inch×26-inch×of 2-mil clear polyester was placed over the Teslin® sheet to act as a release liner. This construction was placed between two 21"×26"×30 mil polished stainless steel metal plates. An identical polyester/treated Teslin® sheet/PVC/PVC/Magnetic Stripe Master Sheet lay-up was placed on top of a stainless plate from the existing construction. A polished metal plate was placed over the exposed polyester release liner. The pattern was repeated ten more times so that twelve pre-pressed multi-layer plies existed in the stack. The resultant stack was placed between buffer pads. The buffer pads are a combination polyamide fiber and mechanical rubber, manufactured and supplied by Yamauchi Corporation, designed to more uniformly distribute temperature and press during thermal lamination. The resultant stack plus buffer pads was then placed between two slightly larger 125 mil un-polished non-corrosive metal plates. This entire construction, referred to as a book, was placed in a TMP laminating press, and preheated to a temperature of 300° F. The composite construction was compression laminated at a pressure of 203 psi. The entire book was held under this condition until the middle plies of the book reached a temperature of 261° F. While still hot, the press was released from all books for one minute then the pressure was re-introduced. The platens were cooled long enough to allow the same center plies to reach a temperature of 100° F. After being removed from the press, all twelve composite sheets were removed from the book. The Mylar release liner was removed from the Teslin® sheet. All twelve finished composite sheets had good integrity; any attempt to delaminate the article, resulted in destroying the Teslin® layer, which demonstrated a good adhesive and essentially seamless bond between the Teslin® and the PVC. ISO7910 ID-1 cards were die cut from the each of the 20-inch×25-inch×30.5 mil composite sheets. The finished cards from each composite sheet had good integrity and good lat flat. The resultant cards did not demonstrate non-blocking behavior, nor did the cards demonstrate good slip performance.

The invention claimed is:

1. An ink recordable substrate coating composition having a pH less than 7 comprising:
   (a) an aqueous polyurethane dispersion comprising an anionic polyurethane comprising aromatic polyether polyurethanes, aliphatic polyether polyurethanes, aromatic polyester polyurethanes, aliphatic polyester polyurethanes, aromatic polycaprolactam polyurethanes, and/or aliphatic polycaprolactam polyurethanes; and
   (b) an aqueous solution of a nitrogen containing polymeric dye fixative compound.

2. The ink recordable substrate coating composition of claim 1 wherein the anionic polyurethane has one or more acid groups selected from the group consisting of carboxylic acid, sulfonic acid and mixtures thereof.

3. The ink recordable substrate coating composition of claim 1 wherein the aqueous solution of a nitrogen containing polymeric dye fixative compound comprises a polymer comprising monomer residues derived from one or more nitrogen containing monomers comprising:

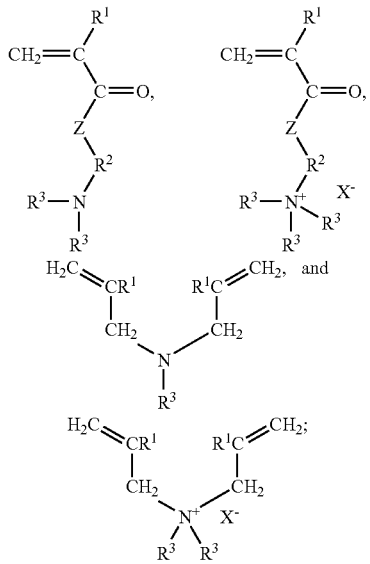

wherein $R^1$ is selected independently for each occurrence in each structure from the group consisting of H and $C_1$ to $C_3$ aliphatic; $R^2$ is independently for each structure a divalent linking group selected from the group consisting of $C_2$ to $C_{20}$ aliphatic hydrocarbon, polyethylene glycol and polypropylene glycol; $R^3$ is independently for each occurrence in each structure selected from the group consisting of H, $C_1$ to $C_{22}$ aliphatic hydrocarbon and a residue from the reaction of the nitrogen with epichlorohydrin; Z is selected from the group consisting of —O— and —$NR^4$—, where $R^4$ is selected from the group consisting of H and $CH_3$; and X is selected from the group consisting of halides and methylsulfate.

4. The ink recordable substrate coating composition of claim 1 wherein the aqueous polyurethane dispersion is present at from 10 to 70 percent by weight of the ink recordable substrate coating composition and the aqueous solution of a nitrogen containing polymeric dye fixative compound is present at from 30 to 90 percent by weight of the ink recordable substrate coating composition.

5. The ink recordable substrate coating composition of claim 3 wherein the nitrogen containing monomer is one or more selected from the group consisting of dimethyl aminoethyl (meth)acrylate, (meth)acryloyloxyethyl trimethyl ammonium halides, (meth)acryloyloxyethyl trimethyl ammonium methylsulfate, dimethyl aminopropyl (meth) acrylamide, (meth)acrylamidopropyl trimethyl ammonium halides, (meth)acrylamidopropyl trimethyl ammonium methylsulfate, aminoalkyl (meth)acrylamides where the amine is reacted with epichlorohydrin, diallyl amine, methyl diallyl amine, and diallyl dimethyl ammonium halides.

6. The ink recordable substrate coating composition of claim 1 wherein the total resin solids is from 1 to 35 wt. % based on the total weight of the ink recordable substrate coating composition.

7. The ink recordable substrate coating composition of claim 1 wherein the viscosity of the ink recordable substrate coating composition is less than 500 cps.

8. The ink recordable substrate coating composition of claim 1 prepared by mixing the nitrogen containing polymeric dye fixative compound (b) into the aqueous polyurethane dispersion (a).

9. An ink recordable substrate coating composition having a pH less than 7 formed by adding (a) an aqueous solution of a polymeric nitrogen containing dye fixative compound to (b) an aqueous anionic polyurethane dispersion comprising one or more anionic polyurethanes comprising aromatic polyether polyurethanes, aliphatic polyether polyurethanes, aromatic polyester polyurethanes, aliphatic polyester polyurethanes, aromatic polycaprolactam polyurethanes, and/or aliphatic polycaprolactam polyurethanes; wherein the total resin solids is from 1 to 35 wt. % based on the total weight of the ink recordable substrate coating composition and the viscosity of the ink recordable substrate coating composition is less than 500 cps.

10. The ink recordable substrate coating composition of claim 9 wherein the aqueous solution of a polymeric nitrogen containing dye fixative compound comprises a polymer comprising monomer residues derived from one or more nitrogen containing monomers selected from the group consisting of:

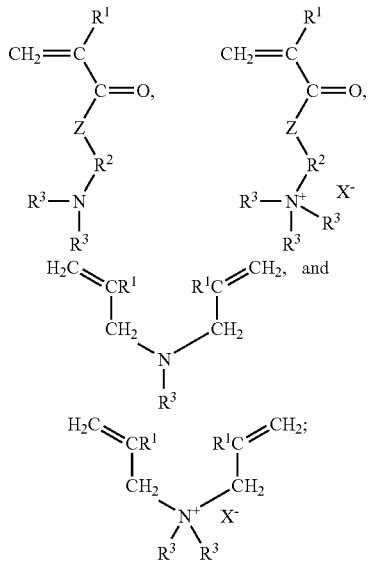

wherein $R^1$ is selected independently for each occurrence in each structure from the group consisting of H and $C_1$ to $C_3$ aliphatic; $R^2$ is independently for each structure a divalent linking group selected from the group consisting of $C_2$ to $C_{20}$ aliphatic hydrocarbon, polyethylene glycol and polypropylene glycol; $R^3$ is independently for each occurrence in each structure selected from the group consisting of H, $C_1$ to $C_{22}$ aliphatic hydrocarbon and a residue from the reaction of the nitrogen with epichlorohydrin; Z is selected from the group consisting of —O— and —$NR^4$—, where $R^4$ is selected from the group consisting of H and $CH_3$; and X is selected from the group consisting of halides and methylsulfate.

11. The ink recordable substrate coating composition of claim 9 wherein the aqueous anionic polyurethane dispersion is present at from 10 to 70 percent by weight of the ink recordable substrate coating composition and the aqueous solution of a nitrogen containing polymeric dye fixative compound is present at from 30 to 90 percent by weight of the ink recordable substrate coating composition.

12. The ink recordable substrate coating composition of claim 10 wherein the nitrogen containing monomer is one or more selected from the group consisting of dimethyl aminoethyl (meth)acrylate, (meth)acryloyloxyethyl trimethyl ammonium halides, (meth)acryloyloxyethyl trimethyl ammonium methylsulfate, dimethyl aminopropyl (meth)acrylamide, (meth)acrylamidopropyl trimethyl ammonium halides,(meth)acrylamidopropyl trimethyl ammonium methylsulfate, aminoalkyl (meth)acrylamides where the amine is reacted with epichlorohydrin, diallyl amine, methyl diallyl amine, and diallyl dimethyl ammonium halides.

13. The ink recordable substrate coating composition of claim 9 wherein the nitrogen containing polymeric dye fixative compound is a polyamide amine reacted with epichlorohydrin.

14. The ink recordable substrate coating composition of claim 9 wherein the anionic polyurethane comprises aromatic polyether polyurethanes, aliphatic polyether polyurethanes, aromatic polyester polyurethanes, and/or aliphatic polyester polyurethanes.

* * * * *